(12) United States Patent
Shen et al.

(10) Patent No.: US 9,745,462 B2
(45) Date of Patent: Aug. 29, 2017

(54) POLYETHYLENE MATERIALS

(75) Inventors: Ming C. Shen, Warsaw, IN (US); Werner Schneider, Rafz (CH)

(73) Assignee: Zimmer GmbH, Winterhur (CH)

( * ) Notice: Subject to any disclaimer, the term of this patent is extended or adjusted under 35 U.S.C. 154(b) by 1280 days.

(21) Appl. No.: 12/621,552

(22) Filed: Nov. 19, 2009

(65) Prior Publication Data

US 2010/0137481 A1 Jun. 3, 2010

Related U.S. Application Data

(60) Provisional application No. 61/116,511, filed on Nov. 20, 2008.

(51) Int. Cl.
| | | |
|---|---|---|
| *C08L 23/06* | (2006.01) | |
| *C08K 5/1545* | (2006.01) | |
| *C08L 51/06* | (2006.01) | |
| *C08F 255/02* | (2006.01) | |
| *C08J 3/24* | (2006.01) | |
| *C08K 5/00* | (2006.01) | |

(52) U.S. Cl.
CPC ............ *C08L 51/06* (2013.01); *C08F 255/02* (2013.01); *C08J 3/24* (2013.01); *C08K 5/005* (2013.01); *C08L 23/06* (2013.01); *C08J 2323/06* (2013.01); *C08K 5/1545* (2013.01); *C08L 2201/08* (2013.01); *C08L 2203/02* (2013.01); *C08L 2205/02* (2013.01); *C08L 2207/068* (2013.01); *C08L 2312/06* (2013.01)

(58) Field of Classification Search
CPC .................................. C08K 5/005; C08L 23/06
USPC .................. 424/423; 524/110, 515; 523/115; 525/191, 240
See application file for complete search history.

(56) References Cited

U.S. PATENT DOCUMENTS

| | | |
|---|---|---|
| 5,106,540 A | 4/1992 | Barma et al. |
| 5,577,368 A | 11/1996 | Hamilton et al. |
| 5,753,182 A | 5/1998 | Higgins |
| 5,827,904 A | 10/1998 | Hahn |
| 5,879,400 A | 3/1999 | Merrill et al. |
| 6,017,975 A | 1/2000 | Saum et al. |
| 6,087,553 A | 7/2000 | Cohen |
| 6,156,845 A | 12/2000 | Saito et al. |
| 6,184,265 B1 | 2/2001 | Hamilton et al. |
| 6,228,900 B1 | 5/2001 | Shen et al. |
| 6,231,804 B1 | 5/2001 | Yamauchi et al. |
| 6,245,276 B1 | 6/2001 | McNulty |
| 6,277,390 B1 | 8/2001 | Schaffner |
| 6,414,086 B1 * | 7/2002 | Wang et al. ................... 525/191 |
| 6,432,349 B1 | 8/2002 | Pletcher |
| 6,437,048 B1 | 8/2002 | Saito et al. |
| 6,448,315 B1 | 9/2002 | Lidgren et al. |
| 6,464,926 B1 | 10/2002 | Merrill et al. |
| 6,503,439 B1 | 1/2003 | Burstein |
| 6,558,794 B1 | 5/2003 | Fehrenbacher |
| 6,562,540 B2 | 5/2003 | Saum et al. |
| 6,620,198 B2 | 9/2003 | Burstein |
| 6,627,141 B2 | 9/2003 | McNulty |
| 6,641,617 B1 | 11/2003 | Merrill et al. |
| 6,664,308 B2 | 12/2003 | Sun |
| 6,664,317 B2 | 12/2003 | King, III |
| 6,692,679 B1 | 2/2004 | McNulty |
| 6,786,933 B2 | 9/2004 | Merrill et al. |
| 6,818,020 B2 | 11/2004 | Sun |
| 6,818,172 B2 | 11/2004 | King et al. |
| 6,852,772 B2 | 2/2005 | Muratoglu et al. |
| 6,853,772 B2 | 2/2005 | Battiato |
| 6,872,764 B2 | 3/2005 | King, III |
| 6,933,026 B2 | 8/2005 | Mauze |
| 7,094,472 B2 | 8/2006 | DuPlessis et al. |
| 7,160,492 B2 | 1/2007 | King |
| 7,166,650 B2 | 1/2007 | Muratoglu et al. |
| 7,214,764 B2 | 5/2007 | King |
| 7,259,198 B2 | 8/2007 | Vaillant |
| 7,304,097 B2 | 12/2007 | Muratoglu et al. |
| 7,335,697 B2 | 2/2008 | King et al. |
| 7,384,430 B2 | 6/2008 | Greer |
| 7,431,874 B2 | 10/2008 | Muratoglu et al. |
| 7,435,372 B2 | 10/2008 | Mimnaugh et al. |
| 7,445,641 B1 | 11/2008 | Ornberg et al. |
| 7,498,365 B2 | 3/2009 | Muratoglu et al. |
| 7,507,774 B2 | 3/2009 | Muratoglu et al. |
| 7,569,620 B2 | 8/2009 | Muratoglu et al. |

(Continued)

FOREIGN PATENT DOCUMENTS

| | | |
|---|---|---|
| CN | 102307945 A | 1/2012 |
| CS | 221403 | 9/1982 |

(Continued)

OTHER PUBLICATIONS

US 7,253,214, 08/2007, McKellop (withdrawn)

(Continued)

*Primary Examiner* — Wenwen Cai

(74) *Attorney, Agent, or Firm* — Schwegman Lundberg & Woessner, P.A.

(57) ABSTRACT

Certain embodiments described herein are directed to polymer compositions including a base material, a secondary material and an antioxidant. The composition also includes crystalline regions and amorphous regions with the crystalline regions comprising at least 62% by volume of the composition. In some embodiments, the base material is an ultra high molecular weight polyethylene material and the secondary material is a polyethylene material that is different than the base material.

13 Claims, 8 Drawing Sheets

(56) References Cited

U.S. PATENT DOCUMENTS

| | | | |
|---|---|---|---|
| 7,615,075 | B2 | 11/2009 | Kunze et al. |
| 7,863,348 | B2* | 1/2011 | Abt et al. ............... 523/113 |
| 2001/0027345 | A1 | 10/2001 | Merrill et al. |
| 2001/0049401 | A1 | 12/2001 | Salovey et al. |
| 2002/0007219 | A1 | 1/2002 | Merrill et al. |
| 2002/0156536 | A1 | 10/2002 | Harris et al. |
| 2003/0013781 | A1 | 1/2003 | Merrill et al. |
| 2003/0045603 | A1 | 3/2003 | Salovey et al. |
| 2003/0105182 | A1 | 6/2003 | Merrill et al. |
| 2003/0119935 | A1 | 6/2003 | Merrill et al. |
| 2003/0127778 | A1 | 7/2003 | Scott et al. |
| 2003/0149125 | A1 | 8/2003 | Muratoglu |
| 2003/0158287 | A1 | 8/2003 | Salovey et al. |
| 2003/0212161 | A1 | 11/2003 | McKellop |
| 2004/0051213 | A1 | 3/2004 | Muratoglu |
| 2004/0156879 | A1 | 8/2004 | Muratoglu et al. |
| 2005/0006821 | A1 | 1/2005 | Merrill et al. |
| 2005/0056971 | A1 | 3/2005 | Merrill et al. |
| 2005/0059750 | A1 | 3/2005 | Sun et al. |
| 2005/0096749 | A1 | 5/2005 | Marrill et al. |
| 2005/0124718 | A1 | 6/2005 | Muratoglu et al. |
| 2005/0125074 | A1 | 6/2005 | Salovey et al. |
| 2005/0146070 | A1 | 7/2005 | Muratoglu et al. |
| 2005/0165495 | A1 | 7/2005 | Merrill et al. |
| 2005/0194722 | A1 | 9/2005 | Muratoglu et al. |
| 2005/0194723 | A1 | 9/2005 | Muratoglu et al. |
| 2005/0267594 | A1 | 12/2005 | Merrill et al. |
| 2006/0079597 | A1 | 4/2006 | Muratoglu et al. |
| 2006/0115668 | A1 | 6/2006 | King et al. |
| 2006/0264541 | A1 | 11/2006 | Lederer et al. |
| 2007/0004818 | A1 | 1/2007 | Muratoglu et al. |
| 2007/0043137 | A1 | 2/2007 | Muratoglu et al. |
| 2007/0059334 | A1 | 3/2007 | Abt et al. |
| 2007/0077268 | A1 | 4/2007 | King et al. |
| 2007/0114702 | A1 | 5/2007 | Muratoglu et al. |
| 2007/0149660 | A1 | 6/2007 | Kumar et al. |
| 2007/0191504 | A1 | 8/2007 | Muratoglu |
| 2007/0232762 | A1 | 10/2007 | Ernsberger et al. |
| 2007/0265369 | A1 | 11/2007 | Muratoglu et al. |
| 2007/0267030 | A1 | 11/2007 | Muratoglu et al. |
| 2007/0275030 | A1 | 11/2007 | Muratoglu et al. |
| 2007/0293647 | A1 | 12/2007 | McKellop |
| 2008/0039545 | A1 | 2/2008 | Muratoglu et al. |
| 2008/0067724 | A1 | 3/2008 | Muratoglu et al. |
| 2008/0090933 | A1 | 4/2008 | Muratoglu et al. |
| 2008/0090934 | A1 | 4/2008 | Muratoglu et al. |
| 2008/0119582 | A1 | 5/2008 | Muratoglu et al. |
| 2008/0133018 | A1 | 6/2008 | Salovey et al. |
| 2008/0133021 | A1 | 6/2008 | Shen et al. |
| 2008/0140196 | A1 | 6/2008 | Schroeder et al. |
| 2008/0214692 | A1 | 9/2008 | Muratoglu et al. |
| 2008/0215142 | A1 | 9/2008 | Muratoglu et al. |
| 2008/0262120 | A1 | 10/2008 | Muratoglu |
| 2008/0274161 | A1 | 11/2008 | Muratoglu et al. |
| 2008/0293856 | A1 | 11/2008 | Kumar et al. |
| 2008/0318022 | A1 | 12/2008 | James et al. |
| 2008/0319137 | A1 | 12/2008 | Rufner et al. |
| 2009/0030524 | A1 | 1/2009 | Schroeder et al. |
| 2009/0105364 | A1 | 4/2009 | Merrill et al. |
| 2009/0118390 | A1 | 5/2009 | Abt et al. |
| 2009/0192610 | A1 | 7/2009 | Case et al. |
| 2009/0265001 | A1 | 10/2009 | Muratoglu et al. |
| 2009/0281624 | A1 | 11/2009 | Conteduca et al. |
| 2010/0029858 | A1 | 2/2010 | Rufner et al. |
| 2011/0136933 | A1* | 6/2011 | Abt et al. ............... 522/75 |

FOREIGN PATENT DOCUMENTS

| | | |
|---|---|---|
| CS | 221403 | 4/1983 |
| EP | 0560279 | 9/1993 |
| EP | 0727195 | 8/1996 |
| EP | 1421918 | 5/2004 |
| EP | 1647242 | 4/2006 |
| WO | WO-8900755 A1 | 1/1989 |
| WO | WO/01/05337 | 1/2001 |
| WO | WO/01/80778 | 11/2001 |
| WO | WO/03/049930 | 6/2003 |
| WO | WO/2004/024204 | 3/2004 |
| WO | WO/2004/064618 | 8/2004 |
| WO | WO/2004/101009 | 11/2004 |
| WO | WO/2007/019874 | 2/2007 |
| WO | WO-2007024874 A2 | 3/2007 |
| WO | WO/2007/056561 | 5/2007 |
| WO | WO/2007/121167 | 10/2007 |
| WO | WO-2008016174 A1 | 2/2008 |
| WO | WO-2008052574 A1 | 5/2008 |
| WO | WO/2008/092047 | 7/2008 |
| WO | WO/2008/101073 | 8/2008 |
| WO | WO/2008/101134 | 8/2008 |
| WO | WO/2008/113388 | 9/2008 |
| WO | WO/2008/124825 | 10/2008 |
| WO | WO/2009/032909 | 3/2009 |
| WO | WO/2009/045658 | 4/2009 |
| WO | WO 2010/129514 | 11/2010 |

OTHER PUBLICATIONS

Yeh et al (Annealing effects of polymers and their underlying molecular mechanisms, Polymer, 1976, vol. 17, April 309-318).*
"New Joint Replacement Material Developed at MGH put to first Clinic Use" news release from Massachusetts General Hospital, dated Jul. 23 2007, accessed May 13, 2008.
"Joint Replacement Material Developed at the MGH" from MA General Hosp.MGH Hotline On-line publication dated Aug 10, 2007.
E-Poly HXLPE Brochure from BioMet Orthopedics, dated 2007.
Wannomae, et al., "Vitamin E Stabilized, Irradiated UHMWPE for Cruciate Retaining Knee Components",, 53rd Annual Meeting of Orthopaedic Research Society,. Feb. 11-14, 2007 Poster No. 1783.
Kurtz, et al., "Trace Concentrations of Vitamin E Protect Radiation Crosslinked UHMWPE from Oxidative Degration", 53rd Annual Meeting of the Orthopaedic Research Society. Feb. 11-14, 2007, Paper No. 0020.
Bragdon, et al., "A New Pin-onDisk Wear Testing Method for Simulating Wear of Polyethylene on Cobalt-Chrome Alloy in Total Hip Arthroplasty", Journal of Arthroplasty, vol. 16 No. 5, 2001 pp. 658-665.
Oral, et al., "x-Tocopherol-doped irradiated UHMWPE for high fatigue resistance and low wear", Biomaterials, vol. 25, 2004, pp. 5515-5522.
Oral, et al., "Characterization of irradiated blends of X-tocopherol and UHMWPE", Biomaterials, vol. 26, 2005, pp. 6657-6663.
Perth, et aL "Studies on the effect of electron beam radiation on the molecular structure of ultra-high molecular eight polyethylene under the influence of x-tocopherol w/ respect to its application in medical implants", JRNL of Materials Science,vol. 13, 2002 pp. 917-.
Tomita, et al., "Prevention of Fatigue Cracks in Ultrahigh Molecular Weight Polyethylene Joint Components by the Addition of Vitamin E" , Applied Biomaterials, vol. 48, 1999, pp. 474-478.
Shibata, et al., "The anti-oxidative properties of x-tocopherol in y-irradiated UHMWPE with respect to fatigue and oxidation resistance", Biomaterials, vol. 26, 2005, pp. 5755-5762.
U.S. Appl. No. 12/813,401, filed Jun. 10, 2010.
U.S. Appl. No. 12/847,741, filed Jul. 30, 2010.
"Chinese Application Serial No. 20098014647.X, Voluntary Amendments filed (w/ English Translation) Jun. 13, 2012", 11 pgs.
"European Application Serial No. 09756680.6, Office Action mailed May 7, 2011", 2 pgs.
"European Application Serial No. 09756680.6, Office Action mailed Jun. 29, 2011", 1 pgs.
"European Application Serial No. 09756680.6, Preliminary Amendment filed May 5, 2011", 5 pgs.
Oral, et al., "Blending a-Tocopherol with UHMWPE Powder for Oxidation Resistance", Poster 1485, 50th Annual Meeting of Orthopaedic Research Society, San Francisco CA, Mar. 7-10, 2004, Transactions, vol. 29, (2004), 1 pg.

(56) References Cited

OTHER PUBLICATIONS

Umare, P. S., et al., "Synthesis of ultra-low-molecular-weight polyethylene wax using a bulky Ti(IV) aryloxide-alkyl aluminum catalytic system", Appl. Organometal. Chem. 2007; (May 21, 2007), 652-660.

"Chinese Application Serial No. 200980146547.X, Office Action mailed Aug. 15, 2013", (W/ English Translation), 11 pgs.

"Chinese Application Serial No. 200980146547.X, Office Action mailed Oct. 29, 2012", (W/ English Translation), 12 pgs.

"Chinese Application Serial No. 200980146547.X, Response filed May 13, 2013 to Office Action mailed Oct. 29, 2013", (W/ English Translation), 13 pgs.

"International Application Serial No. PCT/EP2009/008250, International Preliminary Report on Patentability mailed Feb. 24, 2011", 9 pgs.

"International Application Serial No. PCT/EP2009/008250, Written Opinion mailed Jan. 21, 2010", 5 pgs.

"Chinese Application Serial No. 200980146547.X, Office Action mailed Apr. 16, 2014", (W/ English Translation), 7 pgs.

"Chinese Application Serial No. 200980146547.X, Response filed Dec. 30, 2013 to Office Action mailed Aug. 15, 2013", (W/ English Translation of Claims), 15 pgs.

"Chinese Application Serial No. 200980146547.X, Office Action mailed Apr. 9, 2015", (W/ English Translation), 4 pgs.

"Chinese Application Serial No. 200980146547.X, Office Action mailed Oct. 23, 2014", (W/ English Translation), 4 pgs.

"Chinese Application Serial No. 200980146547.X, Response filed Jan. 7, 2015 to Office Action mailed Oct. 23, 2014", (W/ English Translation), 12 pgs.

"Chinese Application Serial No. 200980146547.X, Response filed Jul. 1, 2014 Office Action mailed Apr. 16, 2014", (W/ English Translation), 16 pgs.

"European Application Serial No. 09756680.6, Communication Pursuant to Article 94(3) EPC mailed Nov. 2, 2016", 4 pgs.

"European Application Serial No. 09756680.6, Response Filed Mar. 9, 2017 to Communication Pursuant to Article 94(3) EPC mailed Nov. 2, 2016", 23 pgs.

* cited by examiner

POLYETHYLENE MATERIALS

PRIORITY APPLICATION

This application claims priority to, and the benefit of, U.S. Provisional Application No. 61/116,511 filed on Nov. 20, 2008, the entire disclosure of which is hereby incorporated herein by reference for all purposes.

TECHNOLOGICAL FIELD

Certain features, aspect and embodiments are directed to compositions, articles and methods that include an ultra high molecular weight polyethylene in combination with another polymeric material. In particular, certain embodiments are directed to compositions that include an ultrahigh molecular weight polyethylene material in combination with another different polyethylene material to provide a composition that is highly crystalline.

BACKGROUND

Ultra high molecular weight polyethylene (UHMWPE) is a widely accepted polymer for orthopedic uses such as acetabular liners, tibial inserts, patellae, glenoids, total disc inserts, etc. UHMWPE typically has a molecular weight exceeding $10^6$ Daltons. When irradiated by gamma or electron beam (e-beam), a certain degree of cross-linking can be achieved, resulting in enhanced wear resistance.

SUMMARY

In a first aspect, a composition comprising an ultra high molecular weight polyethylene material and a cross-linked polymeric material that has a different average molecular weight than an average molecular weight of the ultra high molecular weight polyethylene material is provided. In some examples, the composition may also include an antioxidant. In other examples, the composition comprises crystalline and amorphous regions from each of a cross-linked form of the ultra high molecular weight polyethylene material and the cross-linked polymeric material, and wherein the crystalline regions together comprise at least 62% by volume of the composition.

In certain embodiments, the cross-linked polymeric material is present in a lower amount by weight than the cross-linked form of the ultra high molecular weight polyethylene material. In other embodiments, the cross-linked form of ultra high molecular weight polyethylene material and the cross-linked polymeric material are each present in an effective amount to provide at least a bimodal molecular weight distribution in the composition. In some examples, the first antioxidant is a tocopherol and the cross-linked polymeric material is a different, cross-linked ultra high molecular weight polyethylene material. In additional examples, the crystalline regions comprise first crystalline regions from the cross-linked ultra high molecular weight polyethylene material and second, different crystalline regions from the cross-linked polymeric material. In certain examples, the second, different crystalline regions have a substantially homogenous distribution throughout the first crystalline regions of the composition. In other examples, the first crystalline regions and the second, different crystalline regions each have a substantially homogenous distribution throughout the composition. In some embodiments, the cross-linked polymeric material is present at an amount less than 20% by weight of the composition. In additional embodiments, the composition further comprises a second antioxidant which is the same as or different than the first antioxidant. In other embodiments, the second antioxidant is a tocopherol or a tocotrienol.

In certain examples, the cross-linked polymeric material comprises a cross-linked ultra low molecular weight polyethylene, the first antioxidant comprises vitamin E, and the crystalline regions together comprise at least 62% by volume of the composition. In other examples, the cross-linked polymeric material comprises a cross-linked high density polyethylene, the first antioxidant comprises vitamin E, and the crystalline regions together comprise at least 62% by volume of the composition. In additional examples, the cross-linked polymeric material comprises a cross-linked polyethylene, the first antioxidant comprises vitamin E and the crystalline regions together comprise at least 62% by volume of the composition. In yet other examples, the cross-linked polymeric material comprises a cross-linked medium density polyethylene, the first antioxidant comprises vitamin E, and the crystalline regions together comprise at least 62% by volume of the composition. In some examples, the cross-linked polymeric material comprises a cross-linked low density polyethylene, the first antioxidant comprises vitamin E, and the crystalline regions comprise at least 62% by volume of the composition. In certain embodiments, the cross-linked polymeric material comprises a cross-linked linear low density polyethylene, the first antioxidant comprises vitamin E, and the crystalline regions together comprise at least 62% by volume of the composition. In other embodiments, the cross-linked polymeric material comprises a cross-linked very low density polyethylene, the first antioxidant comprises vitamin E, and the crystalline regions comprise at least 62% by volume of the composition. In some embodiments, the compositions can further include an additive such as, for example, a biological agent. In additional embodiments, the crystalline regions together comprise at least 80% by volume of the composition.

In another aspect, a cross-linked blend comprising a cross-linked ultra high molecular weight polyethylene material and a cross-linked polymeric material having a different average molecular weight than an average molecular weight of the cross-linked ultra high molecular weight polyethylene material is disclosed. In some examples, the composition includes a first antioxidant. In other examples, the composition can include a mixture comprising the cross-linked polymeric material and a second antioxidant, in which the first antioxidant and the second antioxidant may be the same or different. In some embodiments, the composition comprises crystalline and amorphous regions from each of the cross-linked ultra high molecular weight polyethylene material and the cross-linked polymeric material, and wherein the crystalline regions together comprise at least 62% by volume of the cross-linked blend.

In certain embodiments, the cross-linked second polymeric material is present in a lower amount by weight than the cross-linked ultra high molecular weight polyethylene material. In other embodiments, the cross-linked ultra high molecular weight polyethylene material and the cross-linked polymeric material are each present in an effective amount to provide at least a bimodal molecular weight distribution in the composition. In additional embodiments, the second antioxidant is a tocopherol and the polymer material of the cross-linked polymeric material is a different, cross-linked ultra high molecular weight polyethylene. In further embodiments, the crystalline regions comprise first crystalline regions from the cross-linked ultra high molecular weight polyethylene and second, different crystalline regions from the cross-linked polymeric material. In some embodiments, the second, different crystalline regions have a substantially homogenous distribution throughout the first crystalline regions of the composition. In certain embodiments, the first crystalline regions and the second, different crystalline regions each have a substantially homogenous distribution throughout the composition. In other embodiments, the cross-linked polymeric material is present at an amount less than 20% by weight of the composition. In further embodiments, each of the first antioxidant and the second antioxidant is a tocopherol. In additional embodiments, the first antioxidant and the second antioxidant is each a tocopherol or a tocotrienol with the first antioxidant being different than the second antioxidant.

In certain examples, the cross-linked polymeric material comprises a cross-linked ultra low molecular weight polyethylene, the crystalline regions comprise at least 62% by volume of the composition and the first antioxidant and the second antioxidant each comprises vitamin E. In other examples, the cross-linked polymeric material comprises a cross-linked high density polyethylene, the crystalline regions comprise at least 62% by volume of the composition and the first antioxidant and the second antioxidant each comprises vitamin E. In additional examples, the cross-linked polymeric material comprises a cross-linked polyethylene, the crystalline regions comprise at least 62% by volume of the composition and the first antioxidant and the second antioxidant each comprises vitamin E. In further examples, the cross-linked polymeric material comprises a cross-linked medium density polyethylene, the crystalline regions comprise at least 62% by volume of the composition and the first antioxidant and the second antioxidant each comprises vitamin E. In additional examples, the cross-linked polymeric material comprises a cross-linked low density polyethylene, the crystalline regions comprise at least 62% by volume of the composition and the first antioxidant and the second antioxidant each comprises vitamin E. In other examples, the cross-linked polymeric material comprises a cross-linked linear low density polyethylene, the crystalline regions comprise at least 62% by volume of the composition and the first antioxidant and the second antioxidant each comprises vitamin E. In some examples, the cross-linked polymeric material comprises a cross-linked very low density polyethylene, the crystalline regions comprise at least 62% by volume of the composition and the first antioxidant and the second antioxidant each comprises vitamin E. In certain examples, the composition can include an additive such as, for example, a biological agent. In other examples, the cross-linked polymeric material is present in the composition in a lower amount by weight than the cross-linked ultra high molecular weight polyethylene material.

In an additional aspect, a composition comprising an ultra high molecular weight polyethylene material and a cross-linked polymeric material that has a different average particle size than an average particle size of the ultra high molecular weight polyethylene material is provided. In some examples, the composition can include a first antioxidant. In certain examples, the composition comprises crystalline and amorphous regions from each of a cross-linked form of the ultra high molecular weight polyethylene material and the cross-linked polymeric material, and wherein the crystalline regions together comprise at least 62% by volume of the composition.

In certain embodiments, the cross-linked polymeric material is present in a lower amount by weight than the ultra high molecular weight polyethylene material. In other embodiments, the cross-linked form of ultra high molecular weight polyethylene material and the cross-linked polymeric material are each present in an effective amount to provide at least a bimodal molecular weight distribution in the composition. In additional embodiments, the first antioxidant is a tocopherol and the cross-linked polymeric material is a different ultra high molecular weight polyethylene material. In some embodiments, the crystalline regions comprise first crystalline regions from ultra high molecular weight polyethylene material and second, different crystalline regions from the cross-linked polymeric material. In other embodiments, the second, different crystalline regions have a substantially homogenous distribution throughout the first crystalline regions of the composition. In additional embodiments, the first crystalline regions and the second, different crystalline regions each have a substantially homogenous distribution throughout the composition. In other embodiments, the cross-linked polymeric material is present at an amount less than 20% by weight of the composition. In some embodiments, the composition further comprises a second antioxidant which is the same as or different than the first antioxidant. In certain embodiments, the second antioxidant is a tocopherol or a tocotrienol.

In certain examples, the cross-linked polymeric material comprises a cross-linked ultra low molecular weight polyethylene, the first antioxidant comprises vitamin E, and the crystalline regions together comprise at least 62% by volume of the composition. In some examples, the cross-linked polymeric material comprises a cross-linked high density polyethylene, the first antioxidant comprises vitamin E, and the crystalline regions together comprise at least 62% by volume of the composition. In other examples, the cross-linked polymeric material comprises a cross-linked polyethylene, the first antioxidant comprises vitamin E and the crystalline regions together comprise at least 62% by volume of the composition. In additional examples, the cross-linked polymeric material comprises a cross-linked medium density polyethylene, the first antioxidant comprises vitamin E, and the crystalline regions together comprise at least 62% by volume of the composition. In further examples, the cross-linked polymeric material comprises a cross-linked low density polyethylene, the first antioxidant comprises vitamin E, and the crystalline regions comprise at least 62% by volume of the composition. In other examples, the cross-linked polymeric material comprises a cross-linked linear low density polyethylene, the first antioxidant comprises vitamin E, and the crystalline regions together comprise at least 62% by volume of the composition. In additional examples, the cross-linked polymeric material comprises a cross-linked very low density polyethylene, the first antioxidant comprises vitamin E, and the crystalline regions comprise at least 62% by volume of the composition. In some examples, the composition can include an additive such as, for example, a biological agent. In other examples, the crystalline regions of the composition together comprise at least 80% by volume of the composition.

In another aspect, a cross-linked blend comprising a cross-linked ultra high molecular weight polyethylene material and a cross-linked polymeric material is described. In some examples, the composition includes a first antioxidant and a mixture comprising a cross-linked polymeric material and a second antioxidant, In some embodiments, the cross-linked polymeric material has a different average particle size than an average particle size of the cross-linked ultra high molecular weight polyethylene material. In certain embodiments, the first antioxidant and the second antioxidant may be the same or different. In other embodiments, the composition comprises crystalline and amorphous regions from each of the cross-linked ultra high molecular weight polyethylene material and the cross-linked polymeric material, and wherein the crystalline regions together comprise at least 62% by volume of the cross-linked blend.

In certain embodiments, the cross-linked second polymeric material is present in a lower amount by weight than the cross-linked ultra high molecular weight polyethylene material. In other embodiments, the cross-linked ultra high molecular weight polyethylene material and the cross-linked polymeric material are each present in an effective amount to provide at least a bimodal molecular weight distribution in the composition. In additional embodiments, the second antioxidant is a tocopherol and the polymer material of the cross-linked polymeric material is a different, cross-linked ultra high molecular weight polyethylene. In other embodiments, the crystalline regions comprise first crystalline regions from the cross-linked ultra high molecular weight polyethylene and second, different crystalline regions from the cross-linked polymeric material. In further embodiments, the second, different crystalline regions have a substantially homogenous distribution throughout the first crystalline regions of the composition. In additional embodiments, the first crystalline regions and the second, different crystalline regions each have a substantially homogenous distribution throughout the composition. In some embodiments, the cross-linked polymeric material is present at an amount less than 20% by weight of the composition. In other embodiments, each of the first antioxidant and the second antioxidant is a tocopherol. In certain embodiments, the first antioxidant and the second antioxidant is each a tocopherol or a tocotrienol with the first antioxidant being different than the second antioxidant.

In certain examples, the cross-linked polymeric material comprises a cross-linked ultra low molecular weight polyethylene, the crystalline regions comprise at least 62% by volume of the composition and the first antioxidant and the second antioxidant each comprises vitamin E. In other examples, the cross-linked polymeric material comprises a cross-linked high density polyethylene, the crystalline regions comprise at least 62% by volume of the composition and the first antioxidant and the second antioxidant each comprises vitamin E. In additional examples, the cross-linked polymeric material comprises a cross-linked polyethylene, the crystalline regions comprise at least 62% by volume of the composition and the first antioxidant and the second antioxidant each comprises vitamin E. In other examples, the cross-linked polymeric material comprises a cross-linked medium density polyethylene, the crystalline regions comprise at least 62% by volume of the composition and the first antioxidant and the second antioxidant each comprises vitamin E. In some examples, the cross-linked polymeric material comprises a cross-linked low density polyethylene, the crystalline regions comprise at least 62% by volume of the composition and the first antioxidant and the second antioxidant each comprises vitamin E. In other examples, the cross-linked polymeric material comprises a cross-linked linear low density polyethylene, the crystalline regions comprise at least 62% by volume of the composition and the first antioxidant and the second antioxidant each comprises vitamin E. In additional examples, the cross-linked polymeric material comprises a cross-linked very low density polyethylene, the crystalline regions comprise at least 62% by volume of the composition and the first antioxidant and the second antioxidant each comprises vitamin E. In some embodiments, the composition can include at least one additive such as, for example, a biological agent. In other embodiments, the cross-linked polymeric material is present in the composition in a lower amount by weight than the cross-linked ultra high molecular weight polyethylene material.

In an additional aspect, a method comprising combining an ultra high molecular weight polyethylene material with an optional antioxidant and a cross-linked polymeric material that has a different average molecular weight than an average molecular weight of the ultra high molecular weight polyethylene material to provide a blend, and cross-linking the blend to provide a composition comprising crystalline and amorphous regions from each of cross-linked ultra high molecular weight polyethylene material and the cross-linked polymeric material, and wherein the crystalline regions together comprise at least 62% by volume of the composition is disclosed.

In certain embodiments, the cross-linking of the blend is performed by exposing the blend to electron beam radiation. In other embodiments, the method can include preparing the cross-linked polymeric material by exposing a polymeric material to electron beam radiation. In additional embodiments, the method can include heating the polymeric material prior to exposure to the radiation. In other embodiments, the polymeric material is exposed to the electron beam radiation in the presence of another antioxidant which may be the same as or different than the antioxidant. In some embodiments, the method can include mixing the ultra high molecular weight polyethylene material, the antioxidant and the cross-linked polymeric material together until the cross-linked polymeric material is present in a substantially uniform distribution throughout the ultra high molecular weight polyethylene material. In other embodiments, the method can include mixing the ultra high molecular weight polyethylene material, the antioxidant and the cross-linked polymeric material together until the cross-linked polymeric material and the antioxidant are each present in a substantially uniform distribution throughout the ultra high molecular weight polyethylene material. In additional embodiments, the method can include consolidating the blend prior to cross-linking the blend. In some embodiments, the method can include forming the consolidated, cross-linked blend into an implant. In other embodiments, the method can include sterilizing the formed implant.

In certain examples, the method can include selecting the polymeric material of the cross-linked polymeric material to be a cross-linked ultra low molecular weight polyethylene. In other examples, the method can include selecting the polymeric material of the cross-linked polymeric material to be a cross-linked high density polyethylene. In additional examples, the method can include selecting the polymeric material of the cross-linked polymeric material to be a cross-linked polyethylene. In further examples, the method can include selecting the polymeric material of the cross-linked polymeric material to be a cross-linked medium density polyethylene. In certain examples, the method can include selecting the polymeric material of the cross-linked polymeric material to be a cross-linked low density polyethylene. In additional examples, the method can include selecting the polymeric material of the cross-linked polymeric material to be a cross-linked linear low density polyethylene. In other examples, the method can include selecting the polymeric material of the cross-linked polymeric material to be a cross-linked very low density polyethylene. In additional examples, the method can include selecting the antioxidant to be a tocopherol. In some examples, the method can include selecting the antioxidant to be a tocotrienol. In other examples, the method can include mixing the blend with an additive.

In another aspect, a method comprising combining an ultra high molecular weight polyethylene material with an optional antioxidant and a cross-linked polymeric material that has a different average particle size than an average particle size of the ultra high molecular weight polyethylene material to provide a blend, and cross-linking the blend to provide a composition comprising crystalline and amorphous regions from each of cross-linked ultra high molecular weight polyethylene material and the cross-linked polymeric material, and wherein the crystalline regions together comprise at least 62% by volume of the composition.

In certain embodiments, the cross-linking of the blend is performed by exposing the blend to electron beam radiation. In other embodiments, the method can include preparing the cross-linked polymeric material by exposing a polymeric material to electron beam radiation. In additional embodiments, the method can include heating the polymeric material prior to exposure to the radiation. In other embodiments, the polymeric material is exposed to the electron beam radiation in the presence of another antioxidant which may be the same as or different than the antioxidant. In some embodiments, the method can include mixing the ultra high molecular weight polyethylene material, the antioxidant and the cross-linked polymeric material together until the cross-linked polymeric material is present in a substantially uniform distribution throughout the ultra high molecular weight polyethylene material. In additional embodiments, the method can include mixing the ultra high molecular weight polyethylene material, the antioxidant and the cross-linked polymeric material together until the cross-linked polymeric material and the antioxidant are each present in a substantially uniform distribution throughout the ultra high molecular weight polyethylene material. In certain embodiments, the method can include consolidating the blend prior to cross-linking the blend. In other embodiments, the method can include forming the consolidated, cross-linked blend into an implant. In some embodiments, the method can include sterilizing the formed implant.

In certain examples, the method can include selecting the polymeric material of the cross-linked polymeric material to be a cross-linked ultra low molecular weight polyethylene. In other examples, the method can include selecting the polymeric material of the cross-linked polymeric material to be a cross-linked high density polyethylene. In additional examples, the method can include selecting the polymeric material of the cross-linked polymeric material to be a cross-linked polyethylene. In some examples, the method can include selecting the polymeric material of the cross-linked polymeric material to be a cross-linked medium density polyethylene. In additional examples, the method can include selecting the polymeric material of the cross-linked polymeric material to be a cross-linked low density polyethylene. In further examples, the method can include selecting the polymeric material of the cross-linked polymeric material to be a cross-linked linear low density polyethylene. In other examples, the method can include selecting the polymeric material of the cross-linked polymeric material to be a cross-linked very low density polyethylene. In additional examples, the method can include selecting the antioxidant to be a tocopherol. In some examples, the method can include selecting the antioxidant to be a tocotrienol. In other examples, the method can include mixing the blend with an additive.

In an additional aspect, a method comprising combining a first ultra high molecular weight polyethylene material with a first antioxidant, cross-linking the combined first ultra high molecular weight polyethylene material, combining the cross-linked, first ultra high molecular weight polyethylene material with a second ultra high molecular weight polyethylene material to provide a blend, in which the second ultra high molecular weight polyethylene material has a different average molecular weight than an average molecular weight of the cross-linked, first ultra high molecular weight polyethylene material, combining the blend with a second antioxidant, and cross-linking the combined blend and second antioxidant to provide a composition comprising crystalline and amorphous regions and wherein the crystalline regions together comprise at least 62% by volume of the composition is described.

In certain examples, the cross-linking of the combined blend is performed by exposing the blend to electron beam radiation. In other examples, the method can include cross-linking the combined, first ultra high molecular weight polyethylene material using electron beam radiation. In additional examples, the method can include heating the combined, first ultra high molecular weight polyethylene material prior to exposure to the electron beam radiation. In other examples, the method can include mixing the blend and the second antioxidant until the cross-linked, first ultra high molecular weight polyethylene material is present in a substantially uniform distribution throughout the second ultra high molecular weight polyethylene material. In some embodiments, the method can include mixing the blend and the second antioxidant together until the cross-linked, first ultra high molecular weight polyethylene material and the second antioxidant are each present in a substantially uniform distribution throughout the second ultra high molecular weight polyethylene material. In other embodiments, the method can include selecting the first antioxidant and the second antioxidant to be a tocopherol. In additional embodiments, the method can include consolidating the combined blend and second antioxidant prior to cross-linking the combined blend and second antioxidant. In some embodiments, the method can include forming the consolidated, combined blend into an implant. In additional embodiments, the method can include mixing the cross-linked, combined blend with an additive.

In another aspect, a method comprising combining a first ultra high molecular weight polyethylene material with a first antioxidant, cross-linking the combined first ultra high molecular weight polyethylene material, combining the cross-linked, first ultra high molecular weight polyethylene material with a second ultra high molecular weight polyethylene material to provide a blend, in which the second ultra high molecular weight polyethylene material has a different average particle size than an average particle size of the first ultra high molecular weight polyethylene material, combining the blend with a second antioxidant, and cross-linking the combined blend and second antioxidant to provide a composition comprising crystalline and amorphous regions and wherein the crystalline regions together comprise at least 62% by volume of the composition is disclosed.

In certain examples, the cross-linking of the combined blend is performed by exposing the blend to electron beam radiation. In other examples, the method can include cross-linking the combined, first ultra high molecular weight polyethylene material using electron beam radiation. In additional examples, the method can include heating the combined, first ultra high molecular weight polyethylene material prior to exposure to the electron beam radiation. In some examples, the method can include mixing the blend and the second antioxidant until the cross-linked, first ultra high molecular weight polyethylene material is present in a substantially uniform distribution throughout the second ultra high molecular weight polyethylene material. In other examples, the method can include mixing the blend and the second antioxidant together until the cross-linked, first ultra high molecular weight polyethylene material and the second antioxidant are each present in a substantially uniform distribution throughout the second ultra high molecular weight polyethylene material. In some examples, the method can include selecting the first antioxidant and the second antioxidant to be a tocopherol. In other embodiments, the method can include consolidating the combined blend and second antioxidant prior to cross-linking the combined blend and second antioxidant. In additional examples, the method can include forming the consolidated, combined blend into an implant. In other examples, the method can include mixing the cross-linked, combined blend with an additive.

In an additional aspect, a method of facilitating production of an implant comprising providing an ultra high molecular weight polyethylene material, providing a polymeric material having a different average molecular weight than an average molecular weight of the ultra high molecular weight polyethylene, and providing instructions to use the ultra high molecular weight polyethylene material and the polymeric material to produce a composition comprising crystalline and amorphous regions in which crystalline regions together comprise at least 62% by volume of the composition is provided.

In certain embodiments, the method can include providing instructions for using the composition to produce an implant. In other embodiments, the method can include providing instructions for sterilizing the implant. In additional embodiments, the polymeric material having the different average molecular weight is a polyethylene.

In another aspect, a method of facilitating production of an implant comprising providing an ultra high molecular weight polyethylene material, providing a polymeric material having a different average particle size than an average particle size of the ultra high molecular weight polyethylene, and providing instructions to use the ultra high molecular weight polyethylene material and the polymeric material to produce a composition comprising crystalline and amorphous regions in which crystalline regions together comprise at least 55% by volume of the composition is disclosed.

In certain examples, the method can include instructions for using the composition to produce an implant. In additional examples, the method can include providing instructions for sterilizing the implant. In some examples, the polymeric material having the different average particle size is a polyethylene.

In an additional aspect, a method of facilitating production of an implant comprising providing a composition comprising a cross-linked ultra high molecular weight polyethylene material and a cross-linked polymeric material having a different average molecular weight than an average molecular weight of the cross-linked ultra high molecular weight polyethylene, in which the composition comprises crystalline and amorphous regions from each of the materials, and in which crystalline regions together comprise at least 62% by volume of the composition is described.

In another aspect, a method of facilitating production of an implant comprising providing a composition comprising a cross-linked ultra high molecular weight polyethylene material and a cross-linked polymeric material having a different average particle size than an average particle size of the cross-linked ultra high molecular weight polyethylene, in which the composition comprises crystalline and amorphous regions from each of the materials, and in which crystalline regions together comprise at least 62% by volume of the composition is disclosed.

Additional aspects, embodiments, examples and features are described herein.

BRIEF DESCRIPTION OF THE FIGURES

Certain features, aspects, embodiments and examples are described in more detail below with reference to the accompanying figures in which.

Figure 1:
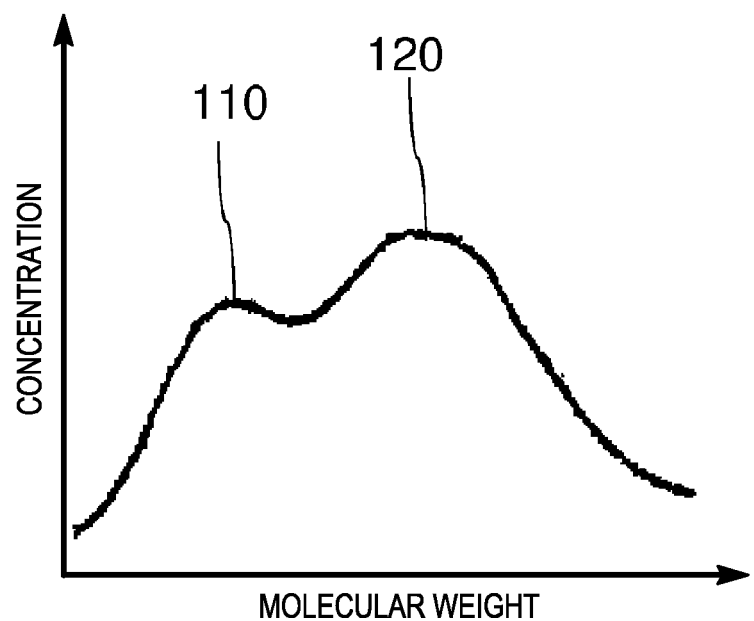
FIG. 1 is a graph of concentration versus molecular weight illustrating bimodal molecular weight distribution of a composition, in accordance with certain hypothetical examples.

The illustrations and figures described below are provided for illustrative purposes only and are not intended to be the only representation or methods for producing the compositions described herein.

DETAILED DESCRIPTION

Certain embodiments of the compositions described herein include a base material, a secondary material present in a lower amount than the base material and optionally an antioxidant. The composition includes crystalline regions and amorphous regions and is characterized by having crystalline regions of 55%, 60%, 62%, 65%, 70%, 75%, 80%, 85% or more by volume of the composition, with the crystalline regions comprising crystalline regions from each of the base material and the secondary material. Such high crystallinity provides desirable physical and mechanical properties so that the compositions are suitable for use in medical implants.

Certain examples of the compositions described herein are directed to an ultra high molecular weight polyethylene (UHMWPE) based composition having increased mechanical properties, such as for example wear resistance, oxidation resistance and tribological properties. Embodiments of the compositions include two or more different crystalline structures or regions in the composition to provide high crystallinities and improved properties. In some examples, crystalline regions from one of the materials may have a substantially uniform distribution in crystalline regions from the other material to permit tighter packing of the materials, which can increase the overall mechanical strength of implants including the composition.

Certain embodiments described below include mixtures of a UHMWPE, which is referred to in certain instances as the base material, and another polymeric material, which may be a different UHMWPE or may be a non-UHMWPE material and which is referred to in certain instances as a secondary material. The exact difference in the two materials can vary, and, in certain embodiments, the two materials have a different average molecular weight, a different average particle size or both. In certain examples, the combination of the two materials can provide a bimodal molecular weight distribution. In other examples, the composition can be cross-linked and still possess a crystallinity higher than that observed in cross-linked UHMWPE alone while not being so brittle to be subject to premature cracking or fatigue. In some examples, the combination of two different crystalline regions can provide high crystallinity while still providing a composition that is not as brittle as compositions having high crystallinities but only a single type of crystal.

In certain examples, the compositions described herein can include two polyethylene materials having a different average molecular weight, a different average particle size or both. In some examples, the compositions can include a first polyethylene, which may or may not be cross-linked, having a first average particle size, and a second polyethylene, which may or may not be cross-linked, having a second average particle size that is different than the first average particle size. In other examples, the compositions can include a first polyethylene, which may or may not be cross-linked, having a first average molecular weight, and a second polyethylene, which may or may not be cross-linked, having a second average molecular weight that is different than the first average molecular weight. By including polyethylenes of different average particle sizes or different average molecular weights in the compositions, different types of crystalline structures can form, which leads to improved wear properties.

In certain embodiments, the compositions described herein can include one or more UHMWPE base materials. UHMWPE is a semi crystalline, linear homopolymer of ethylene, which may be produced by stereospecific polymerization with a Ziegler-Natta catalyst at low pressure (6-8 bar) and low temperature (66-80° C.). The synthesis of nascent UHMWPE results in a fine granular powder. The molecular weight and its distribution can be controlled by process parameters such as temperature, time and pressure. UHMWPE generally has a molecular weight of at least about 2,000,000 g/mol. Suitable UHMWPE materials for use as raw materials may be in the form of a powder or mixture of powders. The UHMWPE material may be prepared almost entirely from UHMWPE powder, or may be formed by combining UHMWPE powder with other suitable materials, solvents, diluents or the like. Examples of suitable UHMWPE materials include, but are not limited to, GUR 1020 and GUR 1050 available from Ticona Engineering Polymers. In certain embodiments, the UHMWPE material may be present in a major amount in the composition. Major amount refers to at least 50% by weight.

Figure 2:
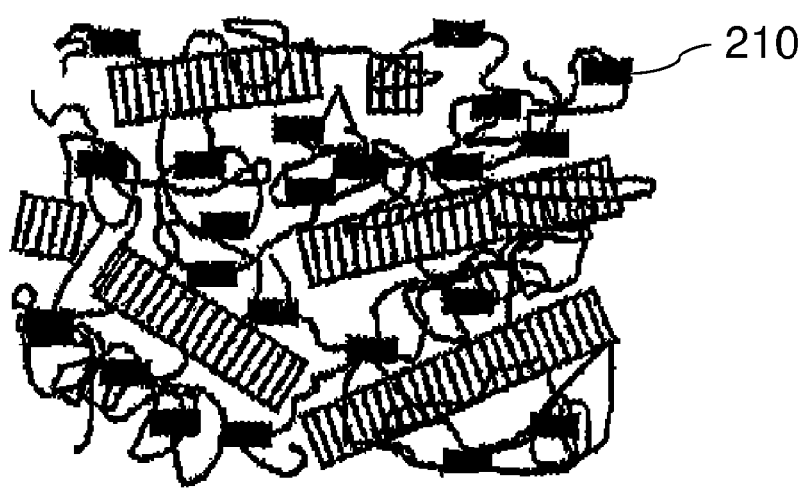
FIG. 2 is an illustration showing crystalline regions of a composition, in accordance with certain examples.

In certain examples, the UHMWPE base material can be combined with a secondary material that can be a different type of UHMWPE material or a non-UHMWPE material. In certain embodiments, it is desirable that the average molecular weight of the different type of UHMWPE material or the non-UHMWPE material be different enough so that a bimodal molecular weight distribution is provided in the final composition. Referring to FIG. 1, an illustration is shown of a hypothetical example where a UHMWPE material is mixed with a different polymeric material to provide the shown bimodal molecular weight distribution. In the hypothetical example, the distribution can include, for example, a first maxima 110, which can represent the average molecular weight of the secondary material, and a second maxima 120, which can represent the average molecular weight of the base material. While the hypothetical example depicted in FIG. 1 shows a composition where the secondary material has a lower average molecular weight than the base material, in some embodiments, the secondary material can have a higher average molecular weight than the base material. In addition to having a bimodal molecular weight distribution, different crystalline regions are present in the final composition, with certain crystalline regions from the base material and other crystalline regions from the secondary material. The total volume of the composition attributed to the crystalline regions can be at least 55%, 60%, 65%, 70%, 75%, 80%, 85%, 90% or more with the balance of the volume representing amorphous regions. For comparison purposes, a typical crystallinity value of known polyethylene materials in the presence of an antioxidant is less than 60%. The degree of crystallinity present in the composition may be determined, for example, using differential scanning calorimetry. In some examples, the crystalline regions of the secondary material can be substantially uniformly distributed within the crystalline regions from the base material. In other examples, the crystalline regions of the secondary material can be present in a substantially non-uniform distribution throughout the crystalline regions of the base material. FIG. 2 is an illustration showing crystalline and amorphous regions in a composition. The crystalline regions are represented in FIG. 2 as a bar 210. In some examples, the composition can be used to provide an implant having a cyclic stress intensity of at least 0.75 MPa-m$^{1/2}$, 0.9 MPa-m$^{1/2}$ or higher. Cyclic stress intensity can be measured, for example, using compact tension (CT) specimens. This describes the fracture mechanical concept of measuring fatigue crack propagation as a function of the cyclic stress intensity factor. CT specimens are cuboids with a square side view, having a defined crack in the middle and a hole in the portions above and below the crack to apply the cyclic forces.

Cyclic deformation and plasticity mechanisms have been linked to wear processes in hip and knee UHMWPE components. Such components are, specifically in tibial inserts, subjected to high cyclic contact stresses resulting in pitting and delamination associated with fatigue and fracture processes. As reported in literature, these fatigue mechanisms have been related to a yield stress associated with the plastic flow of polymers. Clinical performance of UHMWPE implants has been associated with deformation and plasticity induced damage below the articulation surface due to sliding and high contact stresses. The cyclic stress intensity factor ΔK is the characteristic driving parameter for fatigue crack propagation. In diagrams, this is normally plotted against the crack propagation. This represents the velocity of moving fatigue crack subjected to constant stress amplitude loading, which is determined from the change in crack length as a function of the number of loading cycles. A suitable measuring method is standardized for example in ASTM E647-08 Standard Test Method for Measurement of Fatigue Crack Growth Rates. Expressing fatigue crack propagation as a function of stress intensity factor ΔK provides results that are independent of planar geometry, thus enabling exchange and comparison of data obtained from a variety of specimen configurations and loading conditions. Moreover, this feature enables fatigue crack propagation versus stress intensity factor ΔK data to be utilized in the design and evaluation of engineering structures. To establish the influence of fatigue crack growth on the life of components subjected to cyclic loading, provided data are generated under representative conditions and combined with appropriate fracture toughness data and stress analysis information. To explore further concepts as bimodal approaches, it is desirable to assess fatigue behavior of such materials to assist in selection of the parameters including, but not limited to, polymeric fraction, irradiation dose and thermal treatments.

In certain embodiments where the composition includes two different UHMWPE materials, the first UHMWPE material can be GUR1050 and the second UHMWPE material can be GUR1020, either in native form or in a cross-linked form. In other examples, the first UHMWPE material can be GUR1050 and the second UHMWPE material can be cross-linked GUR1050 having an average molecular weight that is different than the GUR1050 of the first material. In some examples, the first UHMWPE material can be GUR1020 and the second UHMWPE material can be cross-linked GUR1050. In additional examples, the first UHMWPE material can be GUR1020 and the second UHMWPE material can be cross-linked GUR1020 having a molecular weight that is different than the GUR1020 of the first material. Other combinations and UHMWPE materials for use as the base and secondary materials will be readily selected by the person of ordinary skill in the art, given the benefit of this disclosure.

In certain examples, the compositions described herein can include a UHMWPE base material and a non-UHMWPE secondary material. The UHMWPE material may be any one or more of the UHMWPE materials described herein or other suitable UHMWPE materials. The non-UHMWPE material is typically a polymeric material and may be based, for example, on ethylene, propylene or other olefinic polymers. Illustrative non-UHMWPE materials that can be used with the UHMWPE base materials include, but are not limited to, non-UHMWPE polyethylenes, polypropylene, thermoplastics, thermosets and other materials. For example, the non-UHMWPE material can be any one or more of an acrylonitrile butadiene styrene polymer, an acrylic polymer, a celluloid polymer, a cellulose acetate polymer, a cycloolefin copolymer, an ethylene-vinyl acetate polymer, an ethylene vinyl alcohol polymer, a fluoroplastic, an ionomer, an acrylic/PVC alloy, a liquid crystal polymer, a polyacetal polymer, a polyacrylate polymer, a polyacrylonitrile polymer, a polyamide polymer, a polyamide-imide polymer, a polyaryletherketone polymer, a polybutadiene polymer, a polybutylene polymer, a polybutylene terephthalate polymer, a polycaprolactone polymer, a polychlorotrifluoroethylene polymer, a polyethylene terephthalate polymer, a polycyclohexylene dimethylene terephthalate polymer, a polycarbonate polymer, a polyhydroxyalkanoate polymer, a polyketone polymer, a polyester polymer, a polyethylene polymer, a polyetheretherketone polymer, a polyetherketoneketone polymer, a polyetherimide polymer, a polyethersulfone polymer, a polyethylenechlorinate polymer, a polyimide polymer, a polylactic acid polymer, a polymethylpentene polymer, a polyphenylene oxide polymer, a polyphenylene sulfide polymer, a polyphthalamide polymer, a polypropylene polymer, a polystyrene polymer, a polysulfone polymer, a polytrimethylene terephthalate polymer, a polyurethane polymer, a polyvinyl acetate polymer, a polyvinyl chloride polymer, a polyvinylidene chloride polymer, a styrene-acrylonitrile polymer or other suitable polymers. As discussed herein, where one or more of these types of polymer is used as a secondary material, the average molecular weight or the average particle size, or both, is desirably different than the selected UHMWPE material used as the base material.

In examples where a non-UHMWPE polyethylene material is used with the UHMWPE material, the non-UHMWPE polyethylene material can be any one or more of an ultra low molecular weight polyethylene (ULMWPE), a high molecular weight polyethylene (HMWPE), a high density polyethylene (HDPE), a high density cross-linked polyethylene (HDXLPE), a cross-linked polyethylene (PEX or XLPE), a medium density polyethylene (MDPE), a low density polyethylene (LDPE), a linear low density polyethylene (LLDPE) and a very low density polyethylene (VLDPE). In some examples, as described in more detail herein, the non-UHMWPE polyethylene material can be cross-linked prior to combining with the UHMWPE material.

In certain embodiments, the secondary material that is combined with the base material can be combined with an antioxidant prior to mixing with the base material. In certain examples, the antioxidant can be mixed or blended until a substantially uniform distribution of the antioxidant is present throughout the secondary material. In other examples, the antioxidant can be doped into, added to or otherwise combined with the secondary material such that a non-uniform distribution of the antioxidant is present in the secondary material. The antioxidant selected for use can be any suitable antioxidant including, but not limited to, a tocopherol such as vitamin E, a tocotrienol, a carotene, a flavinoid, a vitamin, a co-factor or other suitable antioxidants that will be selected by the person of ordinary skill in the art, given the benefit of this disclosure. Where an antioxidant is used with the secondary material, the amount of antioxidant present can vary and desirably the antioxidant is not present in such a large amount that it would interfere with any processing steps that the secondary material undergoes. In some examples, the antioxidant can be present from about 0.1-2 weight percent, e.g., 0.2, 0.3, 0.4 or 0.5 weight percent.

In certain embodiments, mixing or blending of the material can be performed using suitable mixing techniques, blending apparatus and the like. For example, physical mixing, mixing with the aid of a solvent, mixing with the aid of a solvent (e.g. $CO_2$) under supercritical temperature and pressure conditions, and ultrasonic mixing are illustrative techniques that can be used. Suitable mixing processes of these types are also described, for example, in U.S. Pat. Nos. 6,448,315 and 6,277,390, the disclosures of which are hereby incorporated by reference.

In certain examples, the combined secondary material and antioxidant can be subjected to one or more steps prior to combining with the base material. In particular, it may be desirable to subject the secondary material to one or more treatment steps to promote the formation of crystalline regions in the secondary material. In one example, the combined secondary material and antioxidant can be exposed to radiation or a chemical cross-linking agent to promote cross-linking of the secondary material.

In examples where radiation cross-linking is used, the exact form, absorbed dose and dose rate of the radiation can vary, and the radiation used may be, for example, visible light radiation, infrared radiation, ultraviolet radiation, electron beam radiation, gamma radiation, or X-ray radiation. Where ionizing radiation is employed to effect the cross-linking, the radiation can be obtained from any suitable source such as an atomic pile, a resonant transformer accelerator, a Van de Graaff electron accelerator, a Linac electron accelerator, a Rhodotron accelerator, a betatron, a synchrotron, a cyclotron, or the like. Radiation from these sources will produce ionizing radiation such as electrons, protons, neutrons, deuterons, gamma rays, X rays, alpha particles, and beta particles. Illustrative cross-linking dosages may provide a total dose of about 50 kGy to about 200 kGy. In certain examples, the secondary material can be exposed to a series of radiation doses which provide the total dose, whereas in other examples a single radiation dose can be used.

In some examples, exposure of the secondary material to radiation can be performed at room temperature and atmospheric pressure. In other examples, exposure of the secondary material to radiation can be performed at an elevated temperature and atmospheric pressure. For example, it can be desirable to heat the secondary material to a desired temperature prior to cross-linking. Such heating can be performed at atmospheric pressure or can be performed at a pressure greater than or less than atmospheric pressure. Increased temperature and pressures other than atmospheric pressure can assist in the formation of more or fewer crystalline regions within the cross-linked secondary material.

In some examples, a solvent or plasticizer can be present during cross-linking of the secondary material, whereas in other examples, the secondary material can be cross-linked in the absence of a solvent and/or a plasticizer. Depending on the particular material selected for use as the secondary material, it may be desirable to suspend or dissolve the material in a suitable solvent to facilitate cross-linking and any other treatment steps. Once the secondary material is cross-linked, the solvent can be removed or can be included when the cross-linked secondary material is combined with the base material.

In certain embodiments, the cross-linked secondary material can be combined with the base material. The exact amount of each of the materials used can vary and desirably the base material is present in a major amount. In some examples, the percent ratio of base material:secondary material can vary from about 95:5, 90:10, 85:15, 80:20, 75:25, 70:30, 65:45, 60:40, 55:45: 54:46: 53:47: 52:48, 51:49 or any ratio in between these illustrative ratios. In other examples, the base material can be present in a minor amount with the secondary material being present in a major amount. In certain embodiments, the base and secondary materials can be blended until a substantially uniform distribution of the cross-linked polymer of the secondary material is present throughout the base material. In other embodiments, the base and secondary materials can be blended until a substantially uniform distribution of each of the cross-linked polymer and the antioxidant of the secondary material is present throughout the base material. In some examples, it can be desirable to mix the base and secondary materials such that a non-uniform distribution of the secondary material in the base material is present.

In certain examples, the combined base material and the secondary material can be mixed or blended with an antioxidant, which can be the same or a different antioxidant used with the secondary material. In particular, the antioxidant can be any one or more of those antioxidants listed herein including, but not limited to, a tocopherol such as vitamin E, a tocotrienol, a carotene, a flavinoid, a vitamin, a co-factor or other suitable antioxidants that will be selected by the person of ordinary skill in the art, given the benefit of this disclosure. In some examples, the antioxidant added to the combined base and secondary materials is added in an amount that is substantially the same as the amount added to the secondary material, whereas in other examples, the antioxidant can be added to the combined base and secondary materials in a lower or higher amount. It can be desirable, for example, to add the antioxidant at a higher amount where the resulting composition is intended for use as an implant having a high fatigue strength, e.g., a hip or a knee. In certain embodiments, the antioxidant added to the combined blend can be added, for example, in an amount equal to, 1.5 times, two times or three times greater than the amount added to the secondary material. In some examples, about 0.2-5 weight percent antioxidant can be added to the combined blend, e.g., about 0.5, 0.75 or 1.0 weight percent of the antioxidant can be added to the combined blend.

In certain embodiments, the blend of base material, cross-linked secondary material and antioxidant can be exposed to radiation to cross-link the blend. As discussed herein, by cross-linking the blend, crystalline regions from the base material and the secondary material are present. Once the blend is cross-linked, the cross-linked base material and the cross-linked secondary material each contribute to the crystalline regions of the cross-linked blend. In some examples, the crystalline regions of the blend may together comprise at least 55%, 60%, 65%, 70%, 75%, 80%, 85%, 90% or more of the total volume of the blend. In certain embodiments, about 10%, 15% or 20% of the crystalline regions are from the secondary material and the balance of the crystalline regions are from the base material. In certain examples, the radiation used to cross-link the blend can vary and in certain instances visible light radiation, infrared radiation, ultraviolet radiation, electron beam radiation, gamma radiation, or X-ray radiation can be used. The radiation can be obtained from any suitable source such as an atomic pile, a resonant transformer accelerator, a Van de Graaff electron accelerator, a Linac electron accelerator, a Rhodotron accelerator, a betatron, a synchrotron, a cyclotron, or the like. Radiation from these sources will produce ionizing radiation such as electrons, protons, neutrons, deuterons, gamma rays, X rays, alpha particles, and beta particles. Illustrative cross-linking dosages may provide a total dose of about 50 kGy to about 200 kGy. In certain examples, the blend can be exposed to radiation administered in a single dose or in multiple doses.

In certain examples, each of the secondary material and the blend can be cross-linked using electron beam radiation. The use of electron beam radiation may be particularly desirable to provide a composition having desired physical properties. Electron beam radiation exposure may be performed using conventionally available electron beam accelerators. One commercial source for such an accelerator is IBA Technologies Group, Belgium. Suitable accelerators may produce an electron beam energy between about 2 and about 50 MeV, more particularly about 10 MeV, and are generally capable of accomplishing a selected radiation dose and/or dosage rate. Electron beam exposure may be carried out in a generally inert atmosphere, including for example, an argon, nitrogen, vacuum, or oxygen scavenger atmosphere. Exposure may also be carried out in air under ambient conditions as described herein.

In some examples, the blend of base material, cross-linked secondary material and antioxidant can be exposed to a chemical cross-linking agent to cross-link the blend. The cross-linking agent can be used either alone or in combination with radiation to cross-link the blend. Illustrative cross-linking agents include but are not limited to peroxides such as, for example, dicumyl peroxide or other suitable chemical cross-linking agents that will be selected by the person of ordinary skill in the art, given the benefit of this disclosure.

In certain embodiments, the blend can be formed into bar stock or preforms prior to cross-linking or after cross-linking. For example, it can be desirable to form the blend into a desired shape prior to cross-linking. Such shapes may be produced using molding, compression molding or other suitable techniques that can provide a desired form. In some examples, post-shaping treatment steps can be performed such that the shaped material is further shaped or machined into a desired final shape, e.g., into a desired implant such as acetabular liners, tibial inserts, glenoids, artificial hips and knees, cups or liners for artificial hips and knees, spinal replacement disks, intraspinous devices, artificial shoulder, elbow, feet, ankle and finger joints, mandibles, and bearings of artificial hearts and the like. In particular, the compositions described herein can be used in implants where weight bearing and sliding is desired. Such processing may take place in a low humidity and low oxygen environment to prevent premature oxidation of the part. In some embodiments, the material may be used as part of a composite material or may be layered or coated onto another substrate. In other examples, the material may be used as the core of an implant with additional materials layered or coated onto the core.

In certain examples, the shaped material can be sterilized according to known protocols such as exposure to gamma sterilization, electron beam sterilization and/or ethylene-oxide gas sterilization. The radiation dose level used to sterilize is typically less than the dose used to cross-link the blend, though any suitable radiation level that can provide sterilization may be used.

In certain examples, the compositions disclosed herein can be used with one or more additives. The properties and form of the additives can vary and additives may be used to impart a desired color, texture, shape, radioopacity, viscosity or other physical properties to the composition. In some examples, an additive that can promote or deter cross-linking, depending on the desired level of cross-linking in the final composition, can be used. Illustrative cross-linking promoters include, but are not limited to, trimethylolpropane triacrylate, trimethylolpropane trimethacrylate, pentaerythritol tetraacrylate, and pentaerythritol tetramethacrylate. In certain instances, an antioxidant can be present to reduce the degree of cross-linking. Alternatively, other reagents that can scavenge free radicals can be present to reduce the degree of cross-linking in the composition. In some examples, the additive may be another polymer, such as the illustrative polymers described herein.

In certain embodiments, the additive used with the compositions described herein may be a biological agent. Illustrative agents include, but are not limited to, an antibiotic, a steroid, a drug, a growth factor such as bone morphogenic protein, an osteocyte, an osteoclast or other cells, a vitamin, a chondroitin, a glucosamine, a glycosoaminglycan or other biological materials commonly used to in methods to regrow, repair and/or restore bone and/or cartilage injuries.

In certain examples, other additives or components can be combined with the composition at any time during the process. In one embodiment, tribological components such as metal and/or ceramic articulating components and/or preassembled bipolar components may be joined with the composition. In other embodiments, metal backing (e.g. plates or shields) may be added. In further embodiments, surface components such a trabecular metal, fiber metal, Sulmesh® coatings, meshes, cancellous titanium, and/or metal or polymer coatings may be added to or joined with the composition. Still further, radiomarkers or radiopacifiers such as tantalum, steel and/or titanium balls, wires, bolts or pegs may be added. Further yet, locking features such as rings, bolts, pegs, snaps and/or cements/adhesives may be added. These additional components may be used to form sandwich implant designs, radiomarked implants, metal-backed implants to prevent direct bone contact, functional growth surfaces, and/or implants with locking features. Additional suitable components for combining with the compositions described herein to provide an implant having a desired physical structure and/or desired physical features will be readily selected by the person of ordinary skill in the art, given the benefit of this disclosure.

In certain embodiments, the methods described herein can be used to produce a composition without subjecting the composition to post-cross-linking melt annealing. In particular, desirable properties can be achieved in the absence of post-cross-linking melt annealing. Further, melt-annealing can alter the desired level of crystallinity in a non-desired manner. In certain embodiments where no post-cross-linking melt annealing is performed, the compositions described herein may be referred to as non-annealed compositions.

Figure 3:
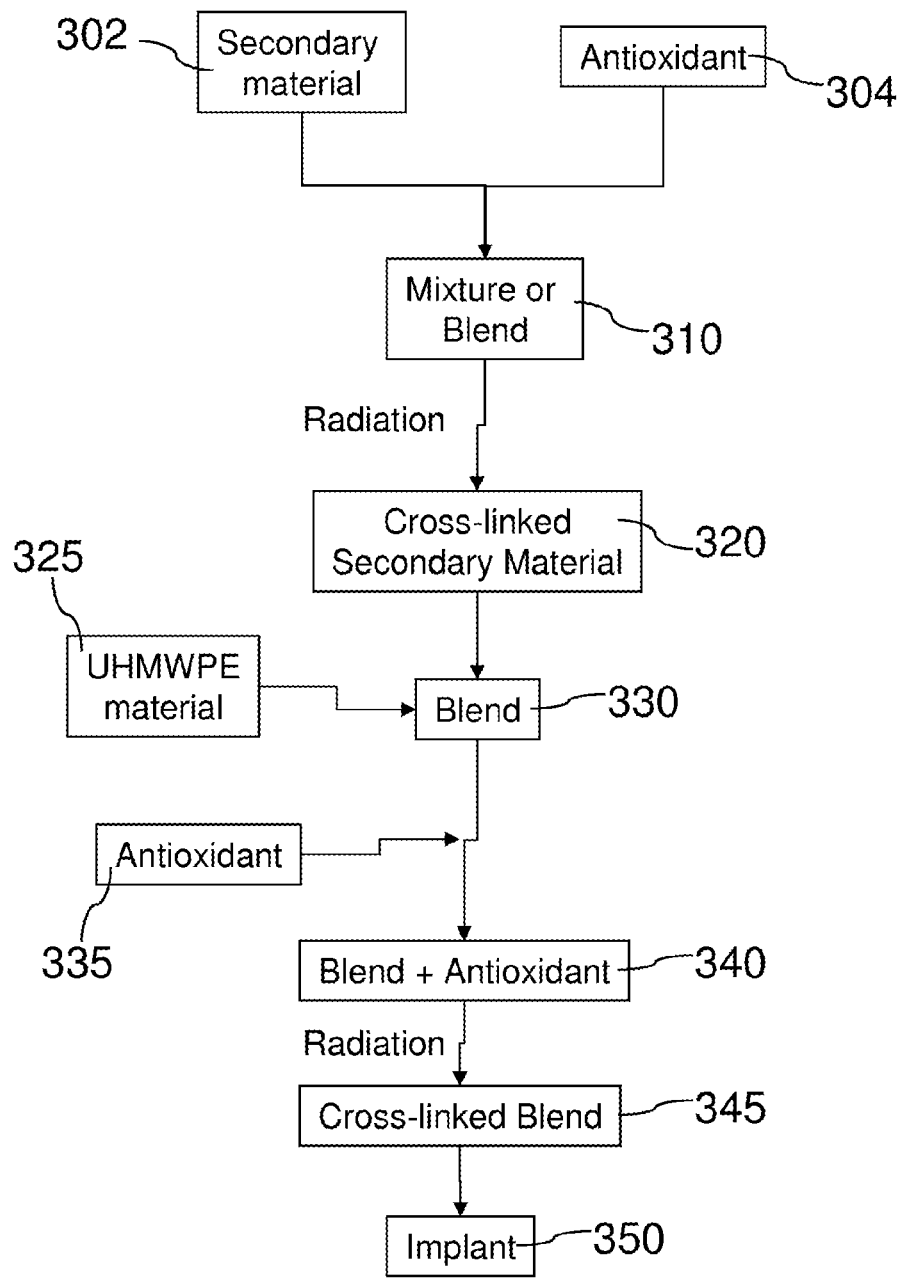
FIG. 3 is a flow chart showing one method of producing the compositions described herein, in accordance with certain examples.

In certain embodiments, the compositions described herein can be produced in many different ways. Referring to FIG. 3, a secondary material 302 can be mixed with an antioxidant 304 to provide a mixture or blend 310. The mixture or blend 310 can be exposed to radiation to provide a cross-linked secondary material 320. The cross-linked secondary material 320 is mixed with a UHMWPE material 325 to provide a blend 330. An antioxidant 335 can be mixed with the blend 330 to provide a blend having an antioxidant 340. The blend with antioxidant 340 can then be exposed to radiation to provide a cross-linked blend 345 and provide a resulting composition having at least 55% by volume crystalline regions. The cross-linked blend 345 can then be shaped or formed into an implant 350.

Figure 4:
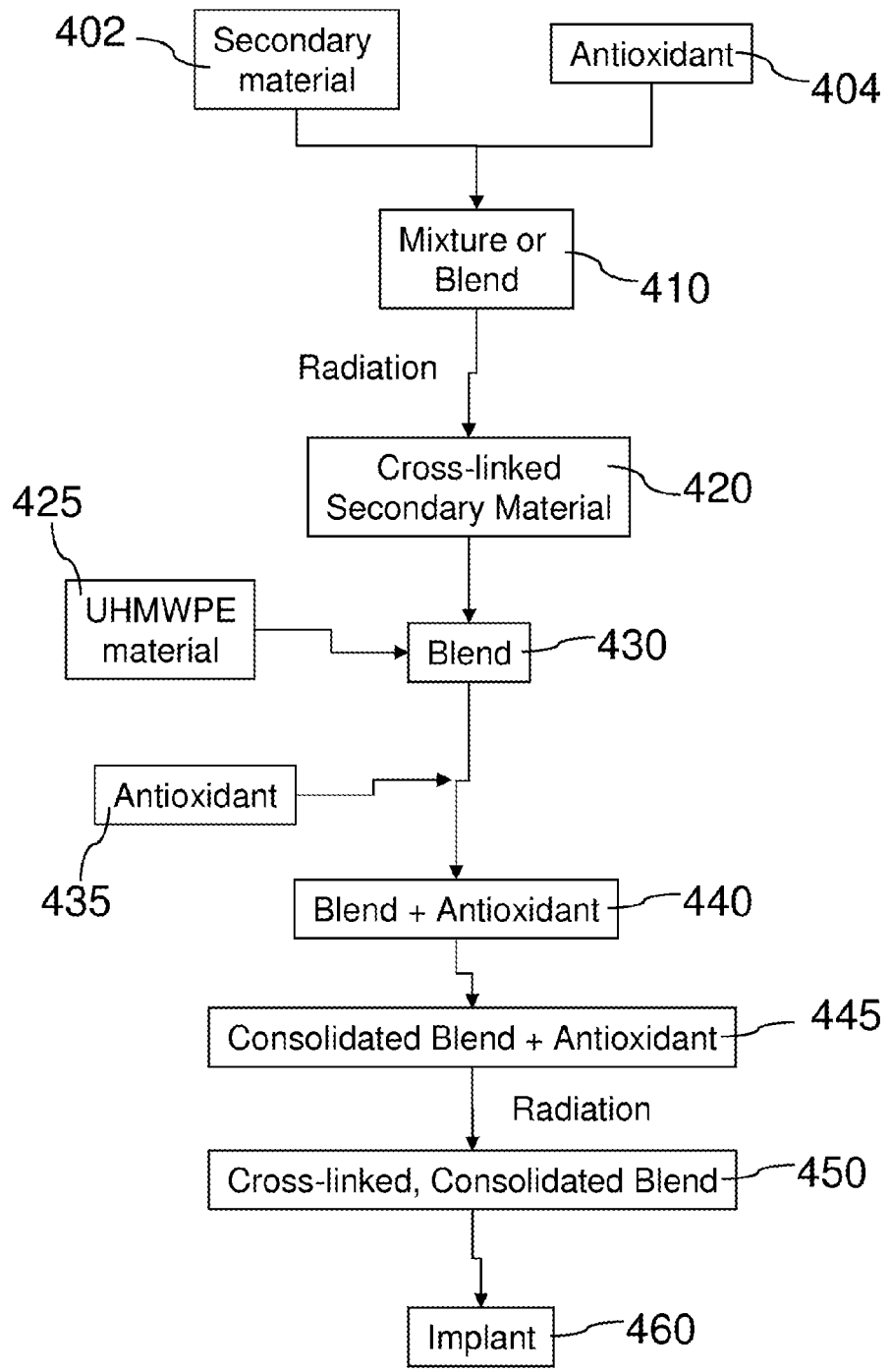
FIG. 4 is another a flow chart showing a method of producing the compositions described herein, in accordance with certain examples.

In other embodiments and referring to FIG. 4, the secondary material 402 can be mixed with an antioxidant 404 to provide a mixture or blend 410. The mixture or blend 410 can be exposed to radiation to provide a cross-linked secondary material 420. The cross-linked secondary material 420 is mixed with a UHMWPE material 425 to provide a blend 430. An antioxidant 435 can be mixed with the blend 430 to provide a blend having an antioxidant 440. The blend with antioxidant can then be consolidated to provide a consolidated blend 445. The consolidated blend 445 can be exposed to radiation to provide a cross-linked blend 450 and to provide a resulting composition having at least 55% by volume crystalline regions. The cross-linked blend can then be shaped or formed into an implant at a step 460.

In certain embodiments, the method can include combining a UHMWPE material and a cross-linked polymeric material that is a different material than the UHMWPE material to provide a blend. In some embodiments, the cross-linked polymeric material may have a different average molecular weight or a different average particle size than the UHMWPE material, in either a cross-linked or non cross-linked form. In certain examples, an antioxidant can be included in the combination. The method can also include cross-linking the blend to provide a composition comprising crystalline and amorphous regions from each of the UHMWPE material and the cross-linked polymeric material, and wherein the crystalline regions together comprise at least 55% by volume of the composition. In some examples, the crystalline regions together comprises at least 60%, 65%, 70%, 75%, 80%, 85% by volume or more of the composition. In certain examples, each of the cross-linking steps can be performed using electron beam radiation or one of the cross-linking steps can be performed using gamma radiation or other cross-linking means. In additional examples, the polymeric material can be heated prior to exposure to the radiation to cross-link the polymeric material. In some examples, the polymeric material can be exposed to the gamma radiation in the presence of another antioxidant which may be the same as or different than the antioxidant. In certain examples, the UHMWPE material, the antioxidant and the cross-linked polymeric material are mixed together until the cross-linked polymeric material is present in a substantially uniform distribution throughout the UHMWPE material. In other examples, the UHMWPE material, the antioxidant and the cross-linked polymeric material are mixed together until the cross-linked polymeric material and the antioxidant are each present in a substantially uniform distribution throughout the UHMWPE material. In some examples, the method can include consolidating the blend prior to cross-linking the blend. In additional examples, the method can include forming the consolidated, cross-linked blend into an implant. In other examples, the method can include sterilizing the formed implant. In some examples, the method can include selecting the polymeric material of the cross-linked polymeric material to be one or more of a cross-linked ultra high or low molecular weight polyethylene, a cross-linked high density polyethylene, a cross-linked polyethylene, a cross-linked medium density polyethylene, a cross-linked low density polyethylene, a cross-linked linear low density polyethylene, or a cross-linked very low density polyethylene, In certain examples, the antioxidant can be a tocopherol, a tocotrienol or combinations thereof. In certain embodiments, the method can include mixing the blend with an additive.

In certain examples, the compositions described herein can be produced using a method that includes cross-linking a first UHMWPE material optionally in the presence of a first antioxidant. The cross-linked, first UHMWPE material can be combined with a second UHMWPE material that is different than the cross-linked, first UHMWPE material to provide a blend. In some examples, the second UHMWPE material has a different average molecular weight or a different average particle size than the cross-linked, first UHMWPE material. In some examples, the blend can be combined with a second antioxidant. The combination can then be cross-linked to provide a composition comprising crystalline and amorphous regions from each of the first and second UHMWPE materials. In some embodiments, the crystalline regions together comprise at least 55% by volume of the composition. In some examples, the crystalline regions together comprises at least 60%, 65%, 70%, 75%, 80%, 85% by volume or more of the composition. In certain examples, each of the cross-linking steps can be performed using electron beam radiation or one of the cross-linking steps can be performed using gamma radiation or other cross-linking means. In some examples, the method can include heating the combined first UHMWPE material prior to exposure to the radiation. In certain examples, the method can include mixing the blend and the second antioxidant until the cross-linked, first UHMWPE material is present in a substantially uniform distribution throughout the second UHMWPE material. In other examples, the method can include mixing the blend and the second antioxidant together until the cross-linked, first UHMWPE material and the second antioxidant are each present in a substantially uniform distribution throughout the second UHMWPE material. In some examples, each of the first antioxidant and the second antioxidant can be a tocopherol, a tocotrienol or combinations thereof. In certain examples, the method can include the combined blend prior to cross-linking. In other examples, the method can include forming the consolidated, combined blend into an implant. In some examples, the method can include mixing the cross-linked, combined blend with an additive.

In certain embodiments, a method of facilitating production of an implant comprises providing a UHMWPE, providing a polymeric material different from the UHMWPE and providing instructions to use the UHMWPE material and the polymeric material to produce a composition comprising crystalline and amorphous regions from each of the UHMWPE material and the polymeric material, and wherein the crystalline regions together comprise at least 55% by volume of the composition. In certain examples, the polymeric material that is different than the UHMWPE can have a different average particle size or a different average molecular weight. In some examples, the method can include instructions for using the composition in an implant. In other examples, the method can include instructions for sterilizing the implant. In additional examples, the method can include instructions for including one or more additives in the composition. Additional steps to facilitate production of an implant including the compositions disclosed herein will be recognized by the person of ordinary skill in art, given the benefit of this disclosure.

In certain examples, a method of facilitating production of an implant comprising providing a composition comprising a cross-linked ultra high molecular weight polyethylene material and a cross-linked polymeric material having a different average molecular weight than an average molecular weight of the cross-linked ultra high molecular weight polyethylene can be performed. In some examples, the composition comprises crystalline and amorphous regions from each of the materials, and in which crystalline regions together comprise at least 62% by volume of the composition.

In certain embodiments, a method of facilitating production of an implant comprising providing a composition comprising a cross-linked ultra high molecular weight polyethylene material and a cross-linked polymeric material having a different average particle size than an average particle size of the cross-linked ultra high molecular weight polyethylene can be performed. In some embodiments, which the composition comprises crystalline and amorphous regions from each of the materials, and in which crystalline regions together comprise at least 62% by volume of the composition.

Certain specific examples are described below to illustrate further some of the novel aspects of the technology described herein.

EXAMPLE 1

The feasibility of blending different polyethylene was studied using three approaches: (1) blend in UHMWPE of different molecular weights; (2) blend in UHMWPE of different grain sizes and (3) blend in UHMWPE with HDPE. The used polyethylenes are shown in Table 1.

TABLE 1

| | Polyethylene type | | | |
|---|---|---|---|---|
| | GUR 1020 | GUR 1050 | GUR 4050-3 | GHR 8020 |
| Grain size [μm] | | | | |
| D10 | 80 | 80 | 30 | n.a. |
| D50 | 150 | 150 | 60 | 210 |
| D90 | 250 | 250 | 90 | n.a. |
| Bulk density [g/cm³] | ≥0.4 | ≥0.4 | 0.45 | 0.45 |
| Viscosity number [mg/l] | 2400 | 3850 | 3600 | n.a. |
| Melting point [° C.] | 130-135 | 130-135 | 130-135 | 133 |
| Molecular weight [g/mol] | $5.0 \times 10^6$ | $9.2 \times 10^6$ | $3.9\text{-}10.5 \times 10^6$ | 300'000 |

To investigate the characteristics of blended polyethylenes the following materials shown in Table 2 were processed for further evaluation.

TABLE 2

| PE grade | Mixing ratio | Comment |
|---|---|---|
| GUR 1020 | 100% | Standard UHMWPE optimized for max. toughness |
| GUR 1050 | 100% | Standard UHMWPE optimized for max. wear resistance |
| GHR 8020 | 100% | HDPE with reduced MW |
| GUR 4050-3 | 100% | UHMWPE with reduced grain size |
| GUR 1020/GUR 1050 | 50%/50% | Blended standard UHMWPE types |
| GUR 1020/GHR 8020 | 75%/25% | Blended UHMWPE with the concept to lower MWPE to fill amorphous space with smaller crystals |
| GUR 1050/GHR 8020 | 75%/25% | |
| GUR 1020/GUR 4050-3 | 75%/25% | Blended UHMWPE with the concept of smaller grains to fill amorphous space with smaller powder |
| GUR 1050/GUR 4050-3 | 75%/25% | |

Blended polyethylenes were mixed in batch quantities to provide homogenous powder blends. Subsequent powder was direct compression molded to pucks. From each trial series, some of the pucks were subjected to an irradiation process for cross-linking of the material. Cross-linking took place at elevated temperature of 120° C. with an electron beam dose of 95 kGy. Since the materials were prepared without addition of vitamin E, the materials were melt annealed for saturation of free radicals. All materials were evaluated by tensile testing, impact testing and differential scanning calorimetry in non-cross-linked and cross-linked conditions. The resulting data is listed below in Table 3.

TABLE 3

| PE grade | Treatment | Yield strength [MPa] | Ultimate tensile strength [MPa] | Elongation at break [%] | Izod impact strength [kJ/m2] | Crystallinity [%] |
|---|---|---|---|---|---|---|
| GUR 1020 | Non-irradiated | 24.0 | 65.5 | 429.8 | 173.0 | 52.1 |
| GUR 1050 | | 23.0 | 67.0 | 376.5 | 112.9 | 50.6 |
| GHR 8020 | | 32.2 | 42.7 | 669.8 | 61.4 | 74.8 |
| GUR 4050-3 | | 21.5 | 60.4 | 390.8 | 140.3 | 47.7 |
| GUR 1020/GUR 1050 | | 23.6 | 65.9 | 407.1 | 143.6 | 53.5 |
| GUR 1020/GHR 8020 | | 26.1 | 48.1 | 361.6 | 125.2 | 62.0 |
| GUR 1050/GHR 8020 | | 25.4 | 47.1 | 316.6 | 134.8 | 57.8 |
| GUR 1020/GUR 4050-3 | | 23.2 | 59.8 | 401.5 | 171.9 | 53.1 |
| GUR 1050/GUR 4050-3 | | 22.6 | 68.7 | 402.0 | 123.8 | 51.7 |
| GUR 1020 | WIAM | 21.0 | 47.2 | 302.4 | 76.9 | 49.1 |
| GUR 1050 | 95 kGy | 20.2 | 44.6 | 280.3 | 75.1 | 46.9 |
| GHR 8020 | E-beam | 26.8 | 44.5 | 448.1 | 72.3 | 63.3 |
| GUR 4050-3 | remelt | 19.1 | 44.9 | 295.4 | 79.4 | 46.1 |
| GUR 1020/GUR 1050 | | 20.6 | 46.1 | 286.6 | 74.9 | 47.6 |
| GUR 1020/GHR 8020 | | 22.3 | 41.5 | 288.7 | 79.2 | 50.2 |
| GUR 1050/GHR 8020 | | 21.9 | 38.1 | 264.2 | 84.8 | 51.9 |
| GUR 1020/GUR 4050-3 | | 20.2 | 45.9 | 297.1 | 78.1 | 47.9 |
| GUR 1050/GUR 4050-3 | | 19.8 | 43.9 | 277.7 | 74.9 | 47.1 |

The results before irradiation are consistent with the blending of UHMWPE with HDPE to provide higher crystallinities of the compression molded material, which was the initial approach (50-52% for UHMWPE, 58-62% for UHMWPE-HDPE). After irradiation and melt-annealing the crystallinity decreased (47-49% for UHMWPE, 50-52% for UHMWPE-HDPE). This decrease was due to the melt annealing. To avoid this decrease, vitamin E can be included in the compositions tested above and the melt-annealing step is not performed. By adding vitamin E, crystallinity values of polyethylene will become higher. The positive increase in crystallinity by including HDPE with UHMWPE can be maintained when vitamin E is used and melt-annealing it omitted. The inclusion of vitamin E should maintain the crystallinities in the 58-62% range or higher. In addition to the vitamin E, the powders can be cross-linked before blending to have even smaller crystalline structures, which can improve the properties of the compositions and provide even higher crystallinities.

Figure 5:
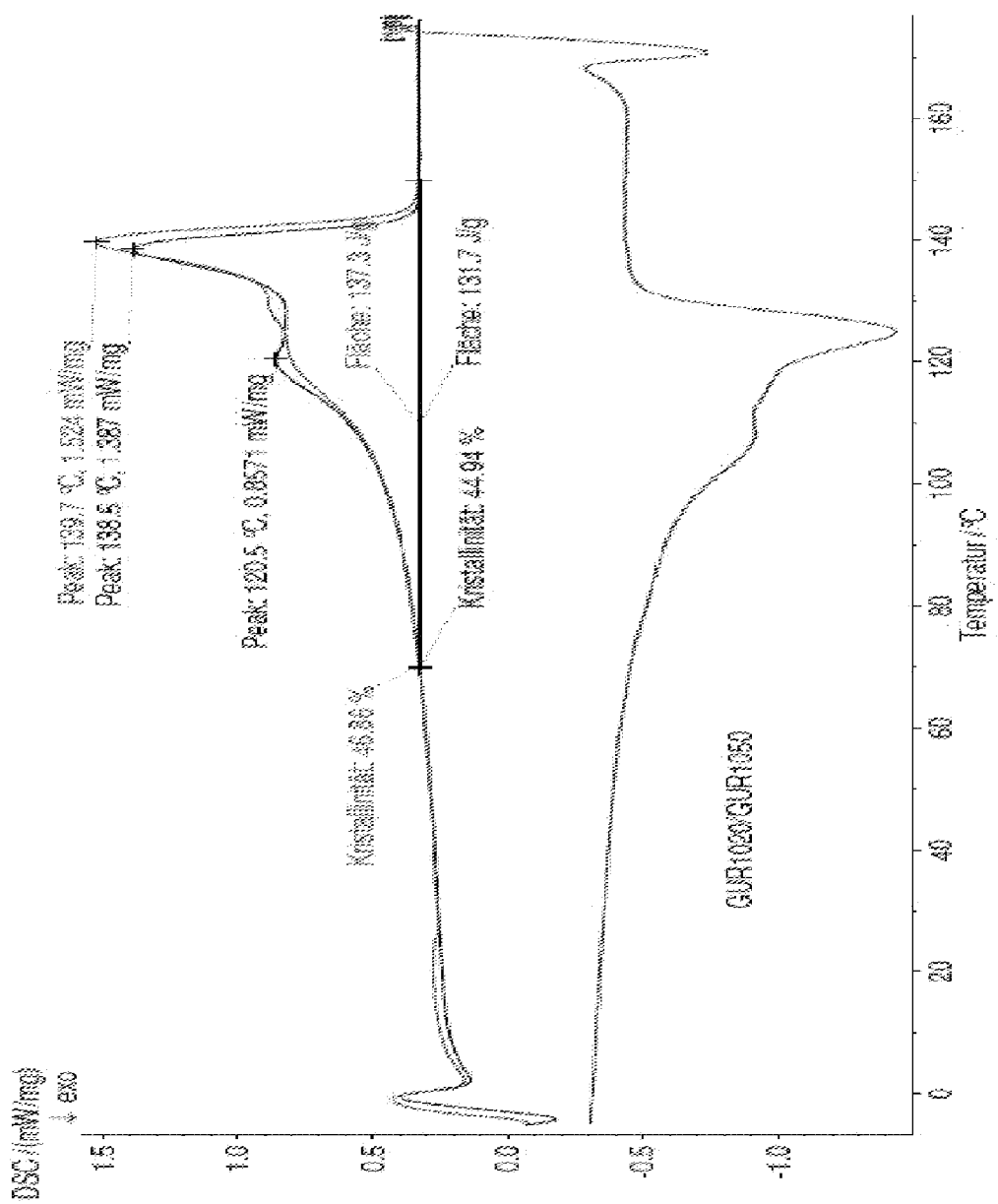
FIG. 5 is a differential scanning calorimetry scan of a mixture of GUR1020/GUR1050 using a first heating cycle, a cooling cycle and a second heating cycle, in accordance with certain examples.

Differential scanning calorimetry (DSC) scans showing the bimodal molecular weight distribution are shown in FIGS. 5-9. FIG. 5 is a DSC scan of a mixture of GUR1020/GUR1050 using a first heating cycle, a cooling cycle and a second heating cycle. The crystallinity was measured to be 46.86% during the first heating cycle, and the peak temperatures was measured to be 139.7° C. During the second heating cycle, the crystallinity was 44.94% and the peak temperature for a first peak was 120.5° C. and was 138.5° C. for a second peak. These results are consistent with the material being stable after being subjected to heating and cooling. The bimodal distribution using the two different materials is also evident.

Figure 6:
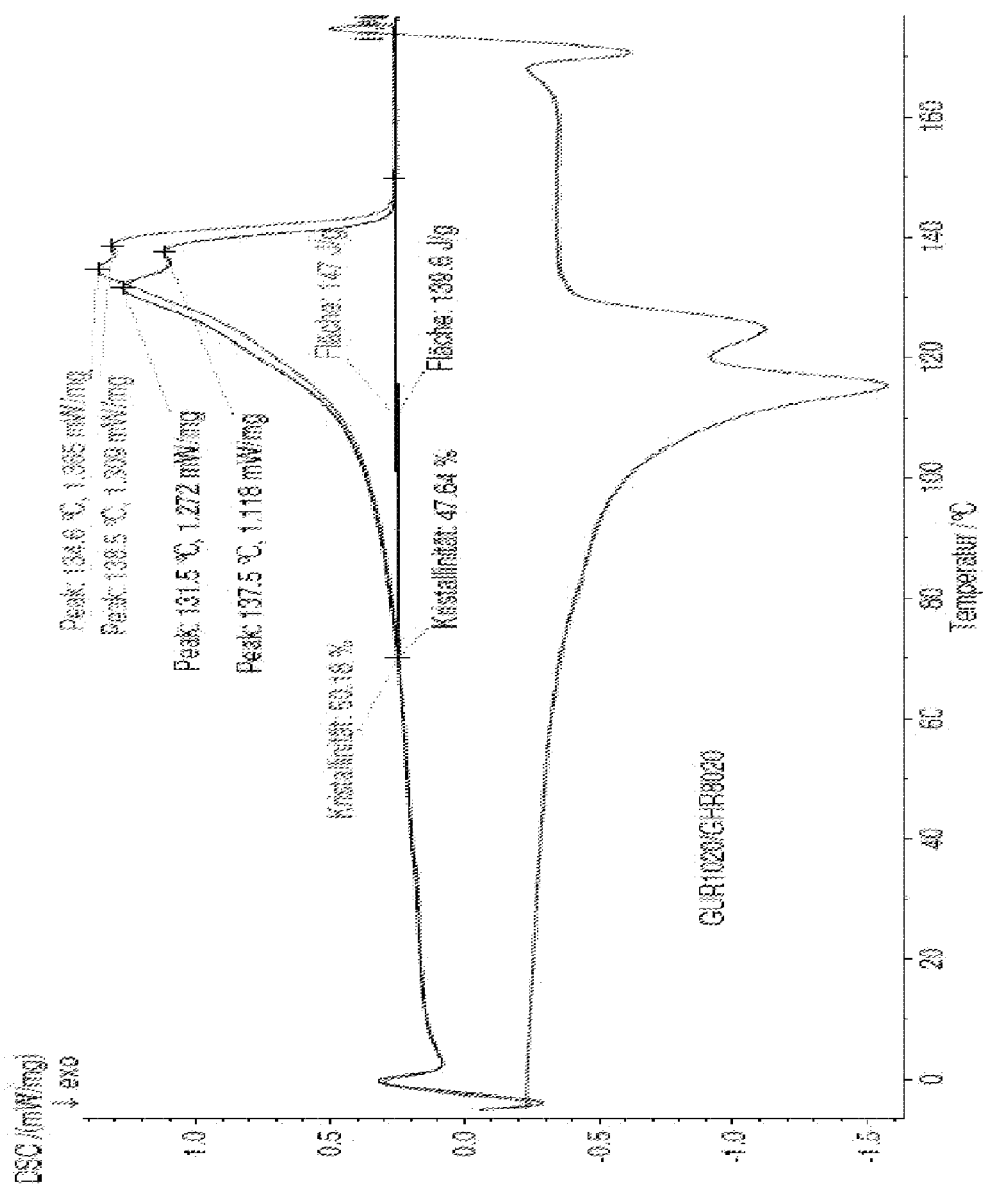
FIG. 6 is a differential scanning calorimetry scan of a mixture of GUR1020/GHR8020 using a first heating cycle, a cooling cycle and a second heating cycle, in accordance with certain examples.

FIG. 6 is a DSC scan of a mixture of GUR1020/GHR8020 using a first heating cycle, a cooling cycle and a second heating cycle. The crystallinity was measured to be 50.18% during the first heating cycle, and the peak temperature was 134.6° C. for a first peak and 138.5° C. for a second peak. During the second heating cycle, the crystallinity was 47.64% and the peak temperature was 131.5° C. for a first peak and 137.5° C. for a second peak. These results are consistent with the material being stable after being subjected to heating and cooling. The bimodal distribution using the two different materials is also evident.

Figure 7:
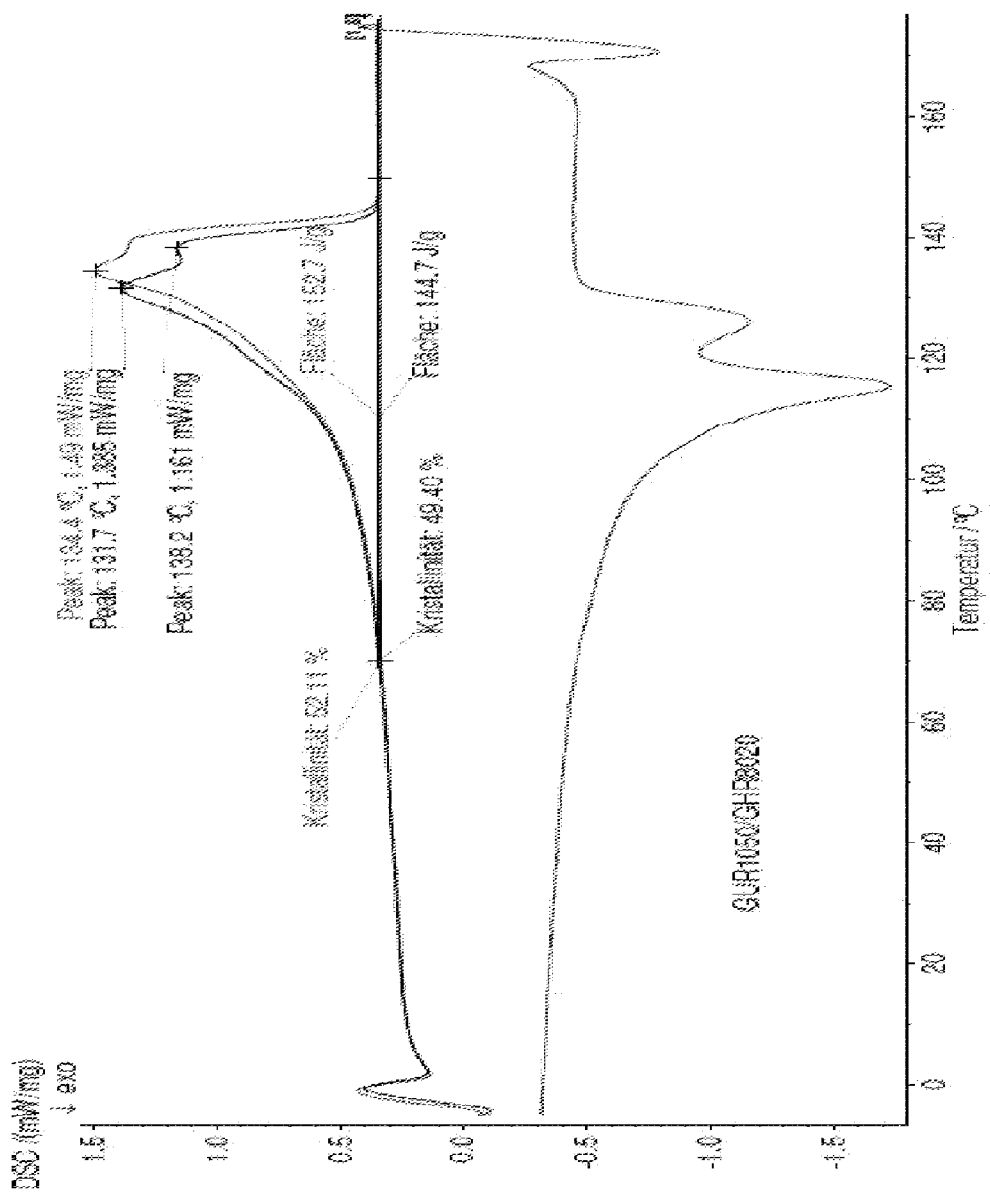
FIG. 7 is a differential scanning calorimetry scan of a mixture of GUR1050/GHR8020 using a first heating cycle, a cooling cycle and a second heating cycle, in accordance with certain examples.

FIG. 7 is a DSC scan of a mixture of GUR1050/GHR8020 using a first heating cycle, a cooling cycle and a second heating cycle. The crystallinity was measured to be 52.11% during the first heating cycle, and the peak temperature was 134.4° C. for a first peak. During the second heating cycle, the crystallinity was 49.40% and the peak temperature was 131.7° C. for a first peak and 138.2° C. for a second peak. These results are consistent with the material being stable after being subjected to heating and cooling. The bimodal distribution using the two different materials is also evident.

Figure 8:
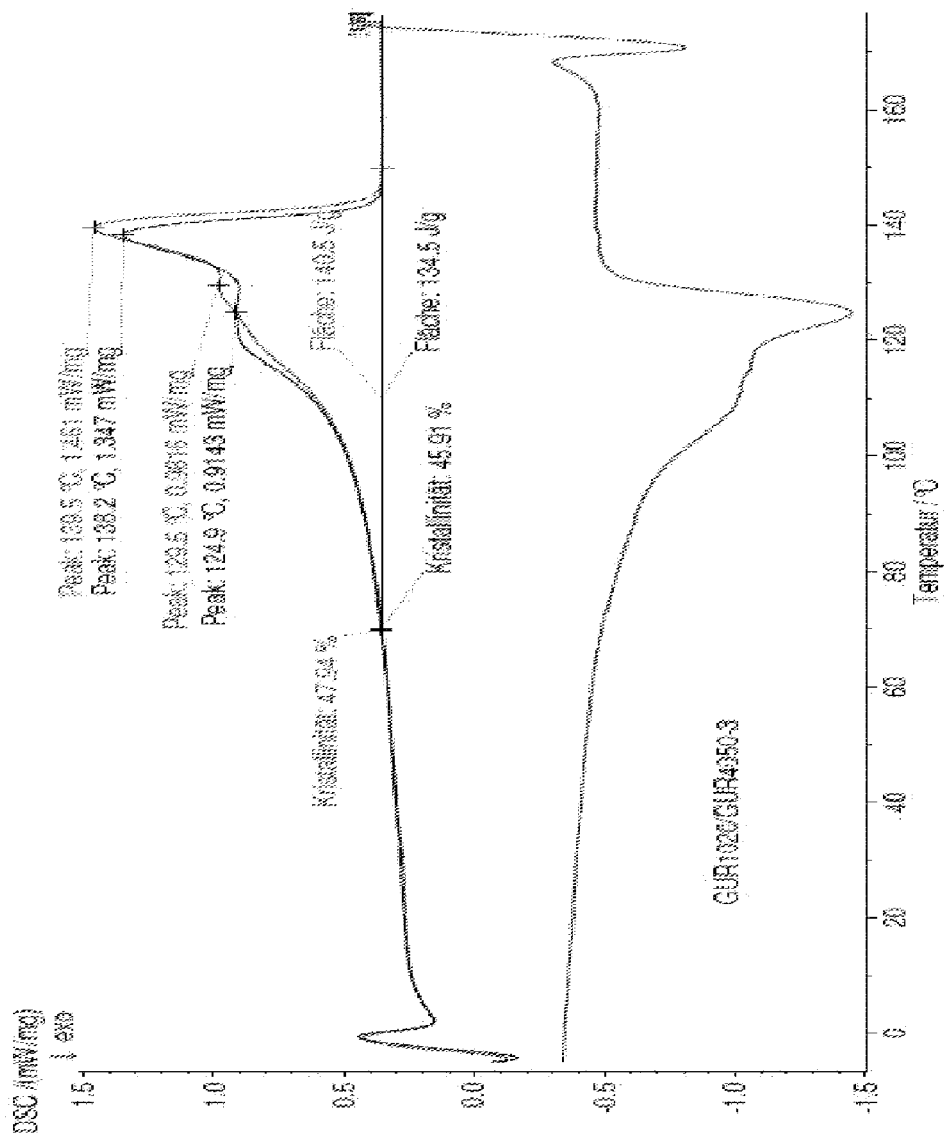
FIG. 8 is a differential scanning calorimetry scan of a mixture of GUR1020/GUR4050-3 using a first heating cycle, a cooling cycle and a second heating cycle, in accordance with certain examples.

FIG. 8 is a DSC scan of a mixture of GUR1020/GUR4050-3 using a first heating cycle, a cooling cycle and a second heating cycle. The crystallinity was measured to be 47.94% during the first heating cycle, and the peak temperature was 129.5° C. for a first peak and 139.5° C. for a second peak. During the second heating cycle, the crystallinity was 45.91% and the peak temperature was 124.9° C. for a first peak and 138.2° C. for a second peak. These results are consistent with the material being stable after being subjected to heating and cooling. The bimodal distribution using the two different materials is also evident.

Figure 9:
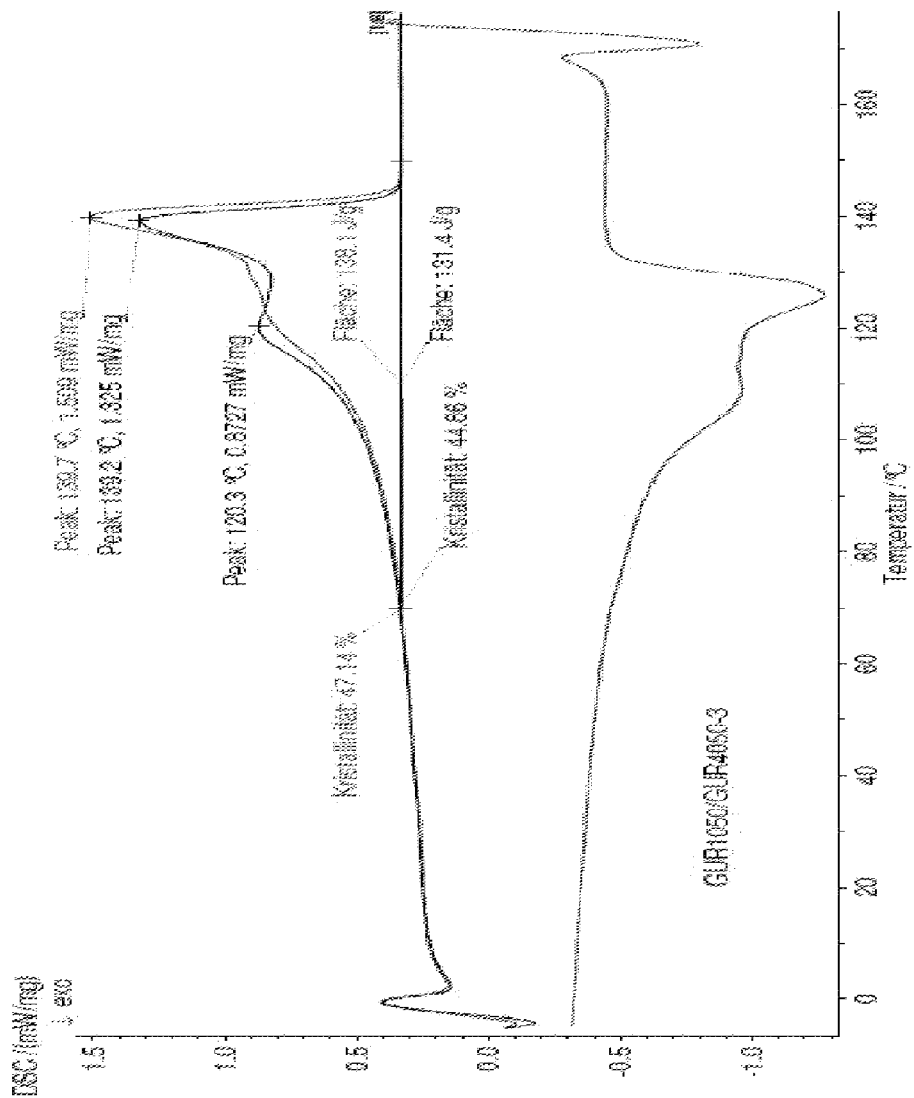
FIG. 9 is a differential scanning calorimetry scan of a mixture of GUR1050/GUR4050-3 using a first heating cycle, a cooling cycle and a second heating cycle, in accordance with certain examples.

FIG. 9 is a DSC scan of a mixture of GUR1050/GUR4050-3 using a first heating cycle, a cooling cycle and a second heating cycle. The crystallinity was measured to be 47.14% during the first heating cycle, and the peak temperature was 139.7° C. for a first peak. During the second heating cycle, the crystallinity was 44.86% and the peak temperature was 120.3° C. for a first peak and 139.2° C. for a second peak. These results are consistent with the material being stable after being subjected to heating and cooling. The bimodal distribution using the two different materials is also evident.

EXAMPLE 2

A composition is produced using a UHMWPE as a base material, a polyethylene powder as a secondary material and vitamin E as an antioxidant. A blend of a polyethylene powder is produced by combining the polyethylene powder with about 0.2 weight percent vitamin E. The combined blend is heated up to about 100° C. The heated, combined blend is irradiated four times with electron beam radiation to provide a total dose of 50 kGy to 200 kGy. The resulting cross-linked material is blended with a UHMWPE, e.g., GUR1020 or other material that is different than the cross-linked polyethylene material, in a ratio of about 20% by weight cross-linked material and 80% by weight UHMWPE. About 0.2 weight percent vitamin E is then added. This blend is then formed into bar or preforms. The formed bars or performs are irradiated with electron beam radiation at a total dose of about 200 kGy. The cross-linked bars or preforms are then machined or shaped into a desired implant, e.g., a hip implant. The implant is optionally sterilized using gamma-sterilization, ethylene oxide gas or other sterilization means.

EXAMPLE 3

A composition is produced using a UHMWPE as a base material, a polyethylene powder as a secondary material and vitamin E as an antioxidant. A blend of the polyethylene powder is produced by combining the polyethylene powder with about 0.2 weight percent vitamin E. The combined blend is heated up to about 100° C. The heated, combined blend is irradiated four times with electron beam radiation to provide a total dose of 50 kGy to 200 kGy. The resulting cross-linked material is blended with a UHMWPE, e.g., GUR1020 or other material that is different than the cross-linked polyethylene, in a ratio of about 20% by weight cross-linked material and 80% by weight UHMWPE. About 0.5 weight percent vitamin E is then added. This blend is then formed into bar or preforms. The formed bars or performs are irradiated with electron beam radiation at a total dose of about 150 kGy. The cross-linked bars or preforms are then machined or shaped into a desired implant, e.g., a knee implant. The implant is optionally sterilized using gamma-sterilization, ethylene oxide gas or other sterilization means.

EXAMPLE 4

A composition is produced using UHMWPE as a base material, an ultra low molecular weight polyethylene as a secondary material and vitamin E as an antioxidant. A blend of an ultra low molecular weight polyethylene is produced by combining the polyethylene with about 0.1-0.2 weight percent vitamin E. The blend is irradiated one-four times with electron beam radiation to provide a total dose of 50 kGy to 200 kGy. The resulting cross-linked material is blended with a UHMWPE, e.g., GUR1020 or other material that is different than the cross-linked ultra low molecular weight polyethylene, in a ratio of about 10-20% by weight cross-linked ultra low molecular weight polyethylene and 80-90% by weight UHMWPE. About 0.2-0.5 weight percent vitamin E is then added. This blend is then formed into bar or preforms. The formed bars or preforms are irradiated with electron beam radiation one to four times at a dose of about 50-200 kGy. The cross-linked bars or preforms are then machined or shaped into a desired implant. The implant is optionally sterilized using gamma-sterilization, ethylene oxide gas or other sterilization means.

EXAMPLE 5

A composition is produced using UHMWPE as a base material, a cross-linked high density polyethylene as a secondary material and vitamin E as an antioxidant. A blend of the cross-linked high density polyethylene is produced by combining the polyethylene with about 0.1-0.2 weight percent vitamin E. The resulting blend is blended with a UHMWPE, e.g., GUR1020 or other material that is different than the cross-linked high density polyethylene, in a ratio of about 10-20% by weight cross-linked high density polyethylene and 80-90% by weight UHMWPE. About 0.2-0.5 weight percent vitamin E is then added. This blend is then formed into bar or preforms. The formed bars or preforms are irradiated with electron beam radiation one to four times at a total dose of about 50-200 kGy. The cross-linked bars or preforms are then machined or shaped into a desired implant. The implant is optionally sterilized using gamma-sterilization, ethylene oxide gas or other sterilization means.

EXAMPLE 6

A composition is produced using UHMWPE as a base material, a high density polyethylene as a secondary material and vitamin E as an antioxidant. A blend of the high density polyethylene is produced by combining the polyethylene with about 0.1-0.2 weight percent vitamin E. The blend is irradiated one-four times with electron beam radiation to provide a total dose of 50 kGy to 200 kGy. The resulting cross-linked material is blended with a UHMWPE, e.g., GUR1020 or other material that is different than the cross-linked high density polyethylene, in a ratio of about 10-20% by weight cross-linked high density polyethylene and 80-90% by weight UHMWPE. About 0.2-0.5 weight percent vitamin E is then added. This blend is then formed into bar or preforms. The formed bars or preforms are irradiated with electron beam radiation one-four times at a total dose of about 50-200 kGy. The cross-linked bars or preforms are then machined or shaped into a desired implant. The implant is optionally sterilized using gamma-sterilization, ethylene oxide gas or other sterilization means.

EXAMPLE 7

A composition is produced using UHMWPE as a base material, a medium density polyethylene as a secondary material and vitamin E as an antioxidant. A blend of the medium density polyethylene is produced by combining the polyethylene with about 0.1-0.2 weight percent vitamin E. The blend is irradiated one to four times with electron beam radiation to provide a total dose of 50 kGy to 200 kGy. The resulting cross-linked material is blended with a UHMWPE, e.g., GUR1020 or other material that is different than the cross-linked medium density polyethylene, in a ratio of about 10-20% by weight cross-linked medium density polyethylene and 80-90% by weight UHMWPE. About 0.2-0.5 weight percent vitamin E is then added. This blend is then formed into bar or preforms. The formed bars or preforms are irradiated with electron beam radiation one to four times at a total dose of about 50-200 kGy. The cross-linked bars or preforms are then machined or shaped into a desired implant. The implant is optionally sterilized using gamma-sterilization, ethylene oxide gas or other sterilization means.

EXAMPLE 8

A composition is produced using UHMWPE as a base material, a low density polyethylene as a secondary material and vitamin E as an antioxidant. A blend of the low density polyethylene is produced by combining the polyethylene with about 0.1-0.2 weight percent vitamin E. The blend is irradiated one to four times with electron beam radiation to provide a total dose of 50 kGy to 200 kGy. The resulting cross-linked material is blended with a UHMWPE, e.g., GUR1020 or other material that is different than the cross-linked low density polyethylene, in a ratio of about 20% by weight cross-linked low density polyethylene and 80% by weight UHMWPE. About 0.2-0.5 weight percent vitamin E is then added. This blend is then formed into bar or preforms. The formed bars or preforms are irradiated with electron beam radiation one to four times at a total dose of about 50-200 kGy. The cross-linked bars or preforms are then machined or shaped into a desired implant. The implant is optionally sterilized using gamma-sterilization, ethylene oxide gas or other sterilization means.

EXAMPLE 9

A composition is produced using UHMWPE as a base material, a linear low density polyethylene as a secondary material and vitamin E as an antioxidant. A blend of the linear low density polyethylene is produced by combining the polyethylene with about 0.1-0.2 weight percent vitamin E. The blend is irradiated one to four times with electron beam radiation to provide a total dose of 50 kGy to 200 kGy. The resulting cross-linked material is blended with a UHMWPE, e.g., GUR1020 or other material that is different than the cross-linked linear low density polyethylene, in a ratio of about 10-20% by weight cross-linked linear low density polyethylene and 80-90% by weight UHMWPE. About 0.2-0.5 weight percent vitamin E is then added. This blend is then formed into bar or preforms. The formed bars or preforms are irradiated with electron beam radiation one to four times at a total dose of about 50-200 kGy. The cross-linked bars or preforms are then machined or shaped into a desired implant. The implant is optionally sterilized using gamma-sterilization, ethylene oxide gas or other sterilization means.

EXAMPLE 10

A composition is produced using UHMWPE as a base material, a very low density polyethylene as a secondary material and vitamin E as an antioxidant. A blend of the very low density polyethylene is produced by combining the polyethylene with about 0.1-0.2 weight percent vitamin E. The blend is irradiated one to four times with electron beam radiation to provide a total dose of 50 kGy to 200 kGy. The resulting cross-linked material is blended with a UHMWPE, e.g., GUR1020 or other material that is different than the cross-linked very low density polyethylene, in a ratio of about 10-20% by weight cross-linked very low density polyethylene and 80-90% by weight UHMWPE. About 0.2-0.5 weight percent vitamin E is then added. This blend is then formed into bar or preforms. The formed bars or preforms are irradiated with electron beam radiation one to four times at a total dose of about 50-200 kGy. The cross-linked bars or preforms are then machined or shaped into a desired implant. The implant is optionally sterilized using gamma-sterilization, ethylene oxide gas or other sterilization means.

When introducing elements of the aspects, embodiments and examples disclosed herein, the articles "a," "an," "the" and "said" are intended to mean that there are one or more of the elements. The terms "comprising," "including" and "having" are intended to be open-ended and mean that there may be additional elements other than the listed elements. It will be recognized by the person of ordinary skill in the art, given the benefit of this disclosure, that various components of the examples can be interchanged or substituted with various components in other examples.

Although certain aspects, examples and embodiments have been described above, it will be recognized by the person of ordinary skill in the art, given the benefit of this disclosure, that additions, substitutions, modifications, and alterations of the disclosed illustrative aspects, examples and embodiments are possible.

What is claimed is:

1. A composition comprising:
one or more crystalline and one or more amorphous regions, the crystalline regions together comprising at least 62% by volume of the composition, the crystalline and amorphous regions together comprising an about 50 kGy to about 200 kGy electron beam irradiation cross-linked form of a blend comprising
a first ultra high molecular weight polyethylene that is about 80 wt % to about 90 wt % of the irradiation cross-linked form of the blend and a cross-linked polymeric material that is about 10 wt % to about 20 wt % of the irradiation cross-linked form of the blend, the cross-linked polymeric material comprising an about 50 kGy to about 200 kGy electron beam irradiation cross-linked form of a blend of a second antioxidant that is vitamin E and a second ultra high molecular weight polyethylene material, wherein the second antioxidant is about 0.1 wt % to about 0.2 wt % of the cross-linked polymeric material and the second ultra high molecular weight polyethylene material is the remainder thereof, and the crosslinked polymeric material is free of melting after the cross-linking of the blend comprising the second antioxidant and the second ultra high molecular weight polyethylene material; and a first antioxidant that is vitamin E and that is about 0.2 wt % to about 0.5 wt % of the irradiation cross-linked form of the blend, at least some of the first antioxidant present in the blend of the first ultra high molecular weight polyethylene material and the cross-linked polymeric material prior to the irradiation;

wherein the second ultra high molecular weight polyethylene material has a different average molecular weight than the first ultra high molecular weight polyethylene material, and wherein the irradiation cross-linked form of the blend is free of melting after the cross-linking of the blend comprising the first ultra high molecular weight polyethylene, the cross-linked polymeric material, and the first antioxidant.

2. The composition of claim 1, wherein the cross-linked form of the first ultra high molecular weight polyethylene material and the cross-linked polymeric material are each present in an amount effective to provide at least a bimodal molecular weight distribution in the composition.

3. The composition of claim 1, wherein the one or more crystalline and amorphous regions comprise one or more first crystalline regions from the cross-linked form of the first ultra high molecular weight polyethylene material and one or more second, different crystalline regions from the cross-linked polymeric material.

4. The composition of claim 3, wherein the one or more second, different crystalline regions have a substantially homogenous distribution throughout the one or more first crystalline regions.

5. The composition of claim 1, wherein the second ultra high molecular weight polyethylene material has a different average particle size than the first ultra high molecular weight polyethylene material.

6. The composition of claim 5, wherein the cross-linked form of the first ultra high molecular weight polyethylene material and the cross-linked polymeric material are each present in an amount effective to provide at least a bimodal molecular weight distribution in the composition.

7. The composition of claim 5, wherein the one or more crystalline and amorphous regions comprise one or more first crystalline regions from the first ultra high molecular weight polyethylene material and one or more second, different crystalline regions from the cross-linked polymeric material.

8. The composition of claim 7, wherein the one or more second, different crystalline regions have a substantially homogenous distribution throughout the one or more first crystalline regions.

9. The composition of claim 1, wherein the crystalline regions together comprise about 62% to 90% by volume of the composition.

10. The composition of claim 1, wherein the crystalline regions together comprise about 62% to 75% by volume of the composition.

11. A method of making a composition of claim 1, comprising:

forming a blend, including combining a first ultra high molecular weight polyethylene material that is about 80 wt % to about 90 wt % of the blend, a first antioxidant that is vitamin E and that is about 0.2 wt % to about 0.5 wt % of the blend, and a cross-linked polymeric material that is about 10 wt % to about 20 wt % of the blend and that comprises an about 50 kGy to about 200 kGy electron beam irradiation cross-linked form of a blend of a second antioxidant that is about 0.1 wt % to about 0.2 wt % of the cross-linked form of the blend and a second ultra high molecular weight polyethylene material that is the remainder of the cross-linked form of the blend, wherein the cross-linked polymeric material is free of melting after the cross-linking of the blend comprising the second antioxidant and the second ultra high molecular weight polyethylene material, wherein the second ultra high molecular weight polymeric material has a different average molecular weight than the first ultra high molecular weight polyethylene material; and electron beam irradiation cross-linking the blend of the first ultra high molecular weight polyethylene material, the first antioxidant, and the cross-linked polymeric material with a total dose of about 50 kGy to about 200 kGy to form a composition comprising one or more crystalline and one or more amorphous regions from the cross-linked form of the blend of the first ultra high molecular weight polyethylene material, the first antioxidant, and the cross-linked polymeric material, the crystalline regions together comprising at least 62% by volume of the composition;

wherein the method is free of melting after the irradiation cross-linking of the blend of the first ultra high molecular weight polyethylene material, the cross-linked polymeric material, and the first antioxidant.

12. The method of claim 11, further comprising selecting the second ultra high molecular weight polyethylene material to be a material with a different average particle size than an average particle size of the first ultra high molecular weight polyethylene material.

13. The method of claim 11, further comprising mixing the first ultra high molecular weight polyethylene material, the first antioxidant, and the cross-linked polymeric material until the cross-linked polymeric material is present in a substantially uniform distribution throughout the ultra high molecular weight polyethylene material.

* * * * *